US010811904B2

(12) United States Patent
Lombardi et al.

(10) Patent No.: US 10,811,904 B2
(45) Date of Patent: Oct. 20, 2020

(54) MODULAR LIGHTING CONTROL SYSTEM

(71) Applicant: Google Incorporated, Mountain View, CA (US)

(72) Inventors: Michael J. Lombardi, Lake Zurich, IL (US); Joseph L. Allore, Mundelein, IL (US); Mitchell J. Hodges, Plainfield, IL (US); Sagid Dalvi, Aurora, IL (US)

(73) Assignee: Google LLC, Mountain View, CA (US)

( * ) Notice: Subject to any disclaimer, the term of this patent is extended or adjusted under 35 U.S.C. 154(b) by 664 days.

(21) Appl. No.: 15/465,394

(22) Filed: Mar. 21, 2017

(65) Prior Publication Data

US 2017/0271921 A1   Sep. 21, 2017

Related U.S. Application Data

(60) Provisional application No. 62/402,436, filed on Sep. 30, 2016, provisional application No. 62/310,875, filed on Mar. 21, 2016.

(51) Int. Cl.
*H05B 47/19* (2020.01)
*H02J 50/10* (2016.01)
(Continued)

(52) U.S. Cl.
CPC .............. *H02J 50/10* (2016.02); *H02J 50/40* (2016.02); *H04B 1/3888* (2013.01); *H04B 1/40* (2013.01); *H05B 47/19* (2020.01)

(58) Field of Classification Search
CPC .......... H02J 50/10; H02J 50/40; H05B 47/19; H04B 1/3888; H04B 1/40
See application file for complete search history.

(56) References Cited

U.S. PATENT DOCUMENTS 5,600,225 A * 2/1997 Goto .................... H02J 50/10
                                                        320/108
6,256,129 B1 * 7/2001 Kim .................. H04B 10/1143
                                                        398/129
(Continued)

FOREIGN PATENT DOCUMENTS

WO       2014128594 A1   8/2014
WO   WO-2015077842 A1   6/2015

OTHER PUBLICATIONS

International Search Report and Written Opinion dated Jun. 28, 2017 as received in Application No. PCT/US2017/023435.
(Continued)

*Primary Examiner* — Pinping Sun
(74) *Attorney, Agent, or Firm* — Butzel Long

(57) ABSTRACT

A modular lighting control system is disclosed for lighting control, modular home electronic devices and home networking of modular electronic devices. The system includes a switch module having one or more magnets, a wireless power transmission coil, an infrared light transmitter and an infrared light receiver and a user interface module having one or more wireless power reception coils, one or more magnets, an infrared light emitter and an infrared light detector. The user interface module can be removably attached to and powered by one or more of the switch modules and communicate with one or more of the switch modules without any mechanical attachment or electrical connection on either the switch module or the user interface module.

25 Claims, 19 Drawing Sheets

(51) Int. Cl.
  *H04B 1/3888*  (2015.01)
  *H02J 50/40*  (2016.01)
  *H04B 1/40*  (2015.01)

(56) References Cited

U.S. PATENT DOCUMENTS

| | | | | |
|---|---|---|---|---|
| 7,436,132 | B1* | 10/2008 | Null | H05B 47/11 |
| | | | | 315/312 |
| 7,821,160 | B1 | 10/2010 | Roosli | |
| 8,810,392 | B1* | 8/2014 | Teller | G08B 21/24 |
| | | | | 235/385 |
| 9,755,437 | B2* | 9/2017 | Kuusilinna | H02J 50/80 |
| 10,008,875 | B1* | 6/2018 | Leabman | H02J 7/025 |
| 2004/0267385 | A1 | 12/2004 | Lingemann | |
| 2006/0173259 | A1* | 8/2006 | Flaherty | A61B 5/0031 |
| | | | | 600/331 |
| 2008/0169910 | A1* | 7/2008 | Greene | H02J 50/20 |
| | | | | 340/10.34 |
| 2010/0131691 | A1* | 5/2010 | Chatterjee | H02J 5/005 |
| | | | | 710/303 |
| 2010/0271296 | A1* | 10/2010 | Kopychev | A61M 1/14 |
| | | | | 345/156 |
| 2013/0076308 | A1* | 3/2013 | Niskala | H04B 5/0075 |
| | | | | 320/108 |
| 2013/0099696 | A1 | 4/2013 | Maxik et al. | |
| 2014/0021795 | A1* | 1/2014 | Robertson | H01F 38/18 |
| | | | | 307/104 |
| 2014/0183946 | A1 | 7/2014 | Recker et al. | |
| 2014/0265880 | A1* | 9/2014 | Taipale | H05B 41/14 |
| | | | | 315/158 |
| 2015/0002088 | A1* | 1/2015 | D'Agostino | H02J 50/70 |
| | | | | 320/108 |
| 2015/0078461 | A1* | 3/2015 | Lee | H04B 5/0031 |
| | | | | 375/256 |
| 2015/0096352 | A1* | 4/2015 | Peterson | G08B 21/182 |
| | | | | 73/31.02 |
| 2015/0189726 | A1* | 7/2015 | Spira | H05B 45/10 |
| | | | | 315/302 |
| 2015/0249339 | A1* | 9/2015 | Van Wageningen | H02J 50/10 |
| | | | | 307/104 |
| 2015/0277559 | A1* | 10/2015 | Vescovi | G06F 3/04883 |
| | | | | 345/173 |
| 2015/0326025 | A1* | 11/2015 | Bell | H01F 38/14 |
| | | | | 307/104 |
| 2015/0331969 | A1 | 11/2015 | Dahlen | |
| 2016/0190855 | A1* | 6/2016 | Katabi | H02J 7/045 |
| | | | | 320/108 |
| 2017/0005565 | A1* | 1/2017 | Bai | H02M 3/33507 |
| 2018/0034326 | A1* | 2/2018 | Abdolkhani | H02J 50/10 |
| 2018/0248408 | A1* | 8/2018 | Chen | H02J 50/05 |
| 2018/0286576 | A1* | 10/2018 | Eiermann | H01F 38/14 |

OTHER PUBLICATIONS

Extended European Search Report for Application No. EP17771001.9, dated Oct. 22, 2019, 8 pages.

* cited by examiner

MODULAR LIGHTING CONTROL SYSTEM

RELATED APPLICATIONS

This application claims the benefit of and priority from U.S. Provisional Application No. 62/310,875 filed on Mar. 21, 2016 and U.S. Provisional Application No. 62/402,436 filed on Sep. 30, 2016, which are fully incorporated herein by reference.

BACKGROUND

Lighting controls remain one of the most common devices in the world. They are in every country, in every home and in every room. In addition to widespread use, the appearance and functionality of the basic light switch remains virtually identical to the original disclosure of the toggle light switch in 1917. New functions like dimming, motion-based activation and programmed lighting schedules have been implemented in various forms over the past fifty years. More recently, companies have started to integrate modern connectivity solutions into the standard light switch allowing it to be controlled remotely via smartphone or other electronic device.

Since lighting controls are typically found at the entrances of rooms and always have a source of constant power, it would be advantageous to use the location of lighting controls for additional functions. Since the useful functions may differ by room, home or user it would also be useful for the additional functionality to be modular such that different types of functionality could be employed in different settings utilizing the same underlying switch design.

SUMMARY OF THE INVENTION

The present disclosure relates generally to modular electrical control system for lighting control, modular home electronic devices and home networking of modular electronic devices. In one implementation of the present disclosure, the system includes a switch module having one or more magnets, a wireless power transmission coil, an infrared light transmitter and an infrared light receiver and a user interface module having one or more wireless power reception coils, one or more magnets, an infrared light emitter and an infrared light detector. The user interface module can be removably attached to and powered by one or more of the switch modules and communicate with one or more of the switch modules without any mechanical attachment or electrical connection on either the switch module or the user interface module.

In another aspect of the present disclosure, the switch module includes a wireless data transceiver having an infrared light transmitter and an infrared light receiver and a hall effect sensor to determine if a separate user interface module is attached to the switch module. In another aspect of the present disclosure, the switch module is installed in a wall-mounted electrical box and configured to measure inductance over a wireless power transmission coil which can transmit power to a separate device. In one aspect of the present disclosure, the wireless power transmission coil is a multi-layer, wire-wound coil backed by a layer of ferrite or other ferrous material. In another aspect of the present disclosure, the switch module includes a tactile switch configured to trigger different lighting events. In one aspect of the present disclosure, the various switch modules can communicate with each other over power lines using antennas.

In another aspect of the present disclosure, the switch module further includes a controller to control the amount of AC power, with a predetermined frequency, provided to an attached electrical load. The switch module is also capable of converting AC power to DC power and vice versa at a new converted frequency which is higher than the predetermined frequency. In another aspect of the present disclosure, various electronic components can be powered up with the DC power.

In one aspect of the present disclosure, the switch module is capable of controlling the amount of power provided to an attached electrical load and includes one or more temperature sensors, a first electrical relay, a second electrical relay, and a triode for alternating current (TRIAC). In another aspect of the present disclosure, the electrical relay is connected in series with the TRIAC and configured to allow current pass through the TRIAC only if the second electrical relay is closed. In another aspect of the present disclosure, the first electrical relay is in a closed position when supplying current directly to the electrical load in a first position of operation and is in an open position when connected to the second relay in a second position of operation. In another aspect of the present disclosure, the first electrical relay is configured to control the electrical load in a non-dimmer mode of operation. In another aspect of the present disclosure, the first electrical relay is configured to allow the TRIAC to control the amount of current supplied to the attached electrical load in a dimmer mode of operation. In another aspect of the present disclosure, the second relay is configured to be in a closed position to operate the switch module in the dimming mode of operation, if the temperature sensors measure a temperature below a predetermined threshold. In another aspect of the present disclosure, the second electrical relay is configured to be in the closed position to allow the switch module to cool, if the temperature sensors measure a temperature above a predetermined threshold. In another aspect of the present disclosure, switch module can alternatively operate in the dimming mode or the non-dimming mode of operation by disabling one or more of the temperature sensors. In another aspect of the present disclosure, the second electrical relay creates a physical air-gap in the dimmer circuit when the dimming level is set to zero. In another aspect of the present disclosure, the second electrical relay is opened and the first electrical relay is closed to avoid excess heat produced by the TRIAC when the dimming level is set to a predetermined maximum. In another aspect of the present disclosure, the switch module further includes a power sensor to measure power supplied to the electrical load. In another aspect of the present disclosure, the switch module can automatically be configured in said dimmer or said non-dimmer modes of operation based on the type of the electrical load being controlled.

In one aspect of the present disclosure, the separate device to which the wireless power transmission coil transmits power, is a user interface device including a touch sensor, a display, light emitting diodes (LEDs) and tactile buttons. In another aspect of the present disclosure, the user interface module includes one or more sensors for temperature, humidity, ambient light and motion. In another aspect of the present disclosure, the user interface module can attach with the switch module using one or more of the magnets. In another aspect of the present disclosure, the magnets and the wireless power transmission coil of the switch module couple with the magnets and the wireless power reception coil in the user interface module. In another aspect of the present disclosure, the user interface module further includes a Hall effect magnet.

In one aspect of the present disclosure, the user interface module comes within a pre-defined close proximity of the switch module, the hall effect sensor detects the presence of the hall effect magnet of the user interface module and configures the switch module to transmit power using the wireless power transmission coil to the wireless power reception coil on the user interface module in order to supply power to the user interface module. In another aspect of the present disclosure, the user interface module further includes one or more microphones and one or more speakers. In another aspect of the present disclosure, the user interface module can complete a boot or initialization sequence and send a confirmatory power up message to the infrared light receiver on the switch module. In another aspect of the present disclosure, if the hall effect sensor does not detect the presence of the hall effect magnet or the infrared light receiver of the switch module does not receive said confirmatory power up message within an pre-determined allotted period of time, then the switch module will cease to supply power over the wireless power transmission coil.

In one implementation of the disclosure, the system includes a closed loop wireless power system comprising having a first device having a power transmission coil, a second device having one or more power reception coils; and an infrared communication system. In another aspect of the present disclosure, the first device is a transmitting device and the second device is a receiving device. In another aspect of the present disclosure, the second device includes an infrared emitter and an infrared detector for each of the one or more power reception coils such that the receiving device with the multiple power reception coils can receive power from multiple first devices. In another aspect of the present disclosure, the second device can communicate with the first device using the infrared communication system to control the amount of power transmitted by the first device to the second device.

In another aspect of the present disclosure, the receiving device with the multiple power reception coils can receive power from multiple first devices and communicate with multiple first devices using the infrared communication system to independently control the amount of power transmitted by multiple first devices. In another aspect of the present disclosure, the closed loop wireless power system includes an infrared communication system between the first device and the second device such that second device can control the amount of power transmitted by the first device.

In one implementation of the present disclosure, the system is an infrared proximity sensing and data communication system which includes an infrared light emitter, an infrared light detector, and a Hall Effect Sensor to detect proximity of a secondary module to the infrared light emitting and detecting unit. The Hall Effect Sensor could be in a first state or a second state. In another aspect of the present disclosure, first state corresponds to a condition when the secondary module is not in proximity to the infrared light emitter and the infrared light detector. In another aspect of the present disclosure, the system further includes a data transmission and a data reception system when the Hall Effect Sensor is in a second state. In another aspect of the present disclosure, the second state corresponds to a condition where the secondary module is in proximity to the infrared light emitter and the infrared light detector. In another aspect of the present disclosure, the data transmission and the data reception system can transmit and receive data to and from the secondary module. In another aspect of the present disclosure, infrared light emitter and said infrared light detector are combined in a single physical component. In another aspect of the present disclosure, infrared light emitter and the infrared light detector are discrete physical components.

In another aspect of the present disclosure, the system includes a switch module configured to control the amount of power provided to an attached electrical load. In another aspect of the present disclosure, the system includes a user interface for indicating the amount of power the switch module should deliver to the attached electrical load. In another aspect of the present disclosure, the switch module includes a data transmission and a data reception system to transmit data to the secondary module. In another aspect of the present disclosure, the data transmission and reception system is configured to operate in a half-duplex mode with the secondary module. In another aspect of the present disclosure, the data transmission and reception system is configured to operate in a full duplex mode with said secondary module.

DETAILED DESCRIPTION

Figure 1:
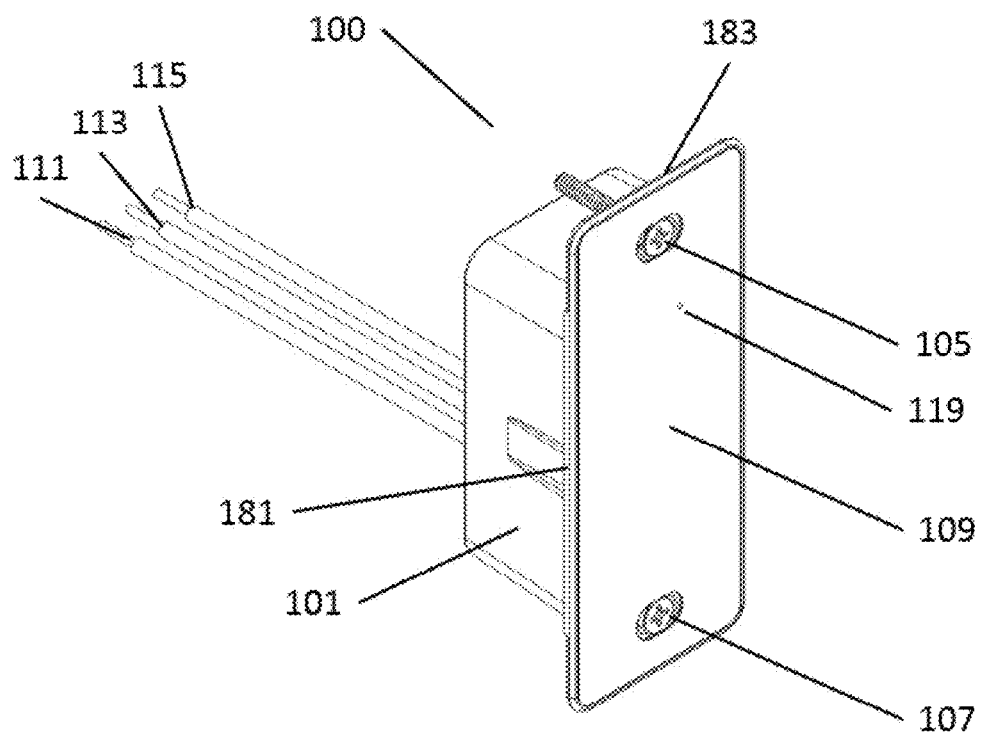
FIG. 1 illustrates an angled view of a switch module.

Lighting controls are frequently found at the entry points of rooms within residential, commercial and industrial buildings. They are installed within switch boxes which are typically attached to the underlying structure of the building. Lighting controls have a standardized attachment scheme such that they can be installed, replaced and/or upgraded over time without modification to the switch box. Multiple lighting controls may be installed within the same switch box. These configurations are often referred to as multi-gang installations and "single-gang", "dual-gang", "triple-gang" refer to the number of lighting controls present in the same switch box.

One implementation of the present disclosure is a modular lighting control system which installs within the existing switch boxes of any gang configuration. The modular lighting control system comprises one or more switch modules, a wall plate and a user interface (UI) module. The switch module is capable of controlling the amount of power provided to an attached load such as a light bulb. The switch module also comprises magnets, a wireless power transmission system with wireless power transmission coil and an infrared (IR) light emitter and IR light detector. The switch module is configured to measure inductance over the wireless power transmission coil. In one implementation, the IR light emitter and IR light detector on the switch may be part of the same physical component. The switch module also comprises a tactile switch such that if a user presses on the center of the front cover of the switch, the tactile switch will actuate and trigger different lighting events to occur. In one implementation, the wall plate covers the switch box, part of the switch and any wiring connecting the switch. It protrudes with some thickness away from the wall.

The UI module comprises a user interface, retention magnets, a wireless power receiving system with wireless power receiving coil and an IR light emitter and IR light detector. The UI module retention magnets draw the UI module into alignment with the magnets of the switch module. In this manner, the UI module is retained in proper alignment and position with the switch module by the retention force of the magnets.

Once aligned, the wireless power receiving coil of the UI module produces an inductance change at the wireless power transmission coil of the switch module. The inductance is measured by the switch module and compared against a predetermined range of inductances known to represent the limits of inductance of different UI module wireless power receiving coils. If the inductance measured falls within the predetermined range of inductances, the switch module IR light emitter and IR light detector begin operating in an IR communication mode and the wireless power transmission system of the switch module begins to transmit power to the UI module. The UI module wireless power receiving system receives the power transmitted from the switch module, automatically begins to power up and starts communicating with the switch module using the IR emitters and detectors in the two devices as an optical data communication system. Immediately after boot up of the UI module, the UI module sends IR signals to indicate that a valid device was docked over the switch module. If the switch module receives IR data confirmation that a valid UI module is docked to it then it continues to provide wireless power transmission to the UI module. If there is no IR data confirmation to the switch module that a valid UI module is present, then despite the presence of inductance that falls within the predetermined range of inductances, the switch module will shut down the wireless power transmission. This prevents the switch module from continuously transmitting power in the presence of inductance alone and requires that the inductance be produced by a UI module that is also capable of sending the IR data confirmation to the switch module of the UI module's presence. After the switch module receives confirmation that a valid UI module is present, the switch module sends a series of data to the UI module via the IR data link. The UI module and switch module are then free to communicate on an as-needed basis while they continue to operate. If the UI module is removed from the switch module, the measured inductance at the wireless power transmission coil in the switch module and/or the measured current passing through the wireless power transmission system in the switch module detects the removal of the UI module and shuts down the wireless power transmission.

As long as the wireless power receiving coil of the UI module continues to generate the proper inductance onto the wireless power transmission coil of the switch module and the UI module communicates to the switch module that it is a valid device, the wireless power transmission system of the switch module transfers power to the wireless power receiving system of the UI module. The parameters of power transmission and reception can be actively controlled using the IR emitter and IR detector on the switch module and the IR emitter and IR detector on the UI module. Thus, the IR data communication system forms a closed loop wireless power transfer system whereby either module is able to adjust the power transmission dynamically based on power needs, temperature level or other parameters.

The switch module, wall plate and UI module may come in various configurations to accommodate different size and feature requirements. In particular, the UI module comprises a set of components including retention magnets, a wireless power receiving coil, an IR emitter and an IR detector. For UI modules intended for multiple gang installations, the set of components are repeated on the back of the device for each switch position. Thus, different implementations of the UI module include devices with a plurality of discrete positions for attachment, wireless power reception and IR data communication such that multiple switch modules can reside behind the UI module itself.

Since multiple switch modules may reside behind a single UI module, the UI module may receive wireless power from multiple discrete wireless power transmission systems simultaneously. Larger UI modules may have a higher number of switch positions and thus be capable of receiving high amounts of total power. However, even large UI modules will often be in low power modes of operation. In addition, a wireless power transmission system on a single switch module may efficiently transmit a significant amount of power to one of the plurality of wireless power reception systems. If the UI module is an implementation with multiple switch positions, the UI module is capable of communicating with multiple switch modules via separate IR communication systems to independently disable or enable the wireless power transmission of the multiple switch modules. This allows the single UI module to prevent excess heat dissipation and energy usage from multiple switch modules transmitting wireless power when fewer switch modules can meet the power needs of the UI module.

Larger UI modules are capable of receiving wireless power from multiple switch modules. UI modules also detect the number of switch modules it interfaces with using wireless power transmission and/or IR communication. UI modules may comprise other peripheral devices such as speakers and light-emitting diodes (LEDs). The UI module may configure peripheral settings such as maximum speaker loudness or maximum LED brightness based on the number of total switch modules it detects beneath it. If more switch modules are present, more power can be provided to the UI module and thus, more loudness or brightness is acceptable for the system.

In one implementation the UI module is configured to operate with multiple switch modules, the UI module comprises retention magnets, a wireless power receiving coil, an IR emitter and an IR detector for each of the multiple switch positions. In addition, the user interface of the UI module is also designed to control the multiple underlying switch modules or other remote switch modules throughout the home. The user interface on the UI module may comprise a display, touch sensor, light emitting diodes (LEDs), tactile buttons or other components.

One implementation of the user interface on the UI module comprises a touch sensor with LEDs under a lens. The LEDs provide a backlit illumination of certain regions of the lens. The touch sensor detects user touches on the lens. Separate regions of the lens may be used to control different switch modules.

In another implementation, the UI module comprises multiple switch positions and can be docked over four switch modules. However, it can also dock over fewer switch modules. For example, if the four position UI module is docked over two switch modules, it can control the two underlying switch modules and have two unassigned switch positions that do not have switch modules beneath them. In this scenario, the touch sensor and LED backlighting are configured to represent a two position lighting control user interface—one for each of the underlying switch modules. If the same UI module were instead docked over three switch modules, the same touch sensor and LED backlighting would be configured to represent a three position lighting control user interface. The lighting and touch sensor—and thus the overall user interface—adapt to present the proper user interface based on the number of underlying switch modules. In other implementations, the UI module can have a size independent of the size of the switch module. For example, the UI module can be larger than the switch module.

The switch modules also comprise a wireless data RF radio and antenna capable of communicating with each other using wireless networking standards such as IEEE 802.15.4 which higher level protocols such as ZigBee and Thread are based on. This allows multiple switch modules throughout a home not installed in the same switch box to remain in communication with each other. Instead of peer-to-peer or one-to-many network topologies, the plurality of switch modules installed in a home may instead form a mesh network such that a single point of failure does not impact connectivity for the other devices in the home. When a UI module physically docks over one or more switch modules that are connected to the wireless mesh, the UI module may not join the wireless mesh using the same wireless networking standard. Instead, the UI module uses the IR data communication system to one or more underlying switches to be able to send commands through the mesh network. Using this system, a UI module can control any switch module on the mesh network, not just a switch module physically behind it.

Reverting to the example four position UI module docked over just two physical switch modules, the wireless mesh network between switches allows the unassigned positions of the UI module to be assigned to control switch modules anywhere on the mesh network. When an unassigned position of the UI module is assigned to control a switch elsewhere on the mesh, the user interface of the UI module adapts and configures the touch sensor and LED backlighting to represent a three position lighting control user interface.

Since the switch modules are able to form a wireless mesh network and the UI modules are able to communicate with the mesh network via IR data communication, it would be useful to assign names to the switch modules and UI modules. However, because the switch modules are mechanically attached to the switch box and the UI modules are easily removed since they are attached magnetically, the UI modules may be replaced over time or moved to a different area of the home for various reasons. In addition, UI modules may have switch positions that control other switch modules on the mesh. If a UI module is moved to another location in the home, a user may not want the UI module to continue to control the same switch module(s) on the mesh network. Thus, the name of switch modules, assignment of remote switch module control and name of UI modules are all stored in a memory on the switch module. This allows a first UI module to be removed and a second UI module to be attached over the same switch modules as the first UI module was previously docked over. Since the first UI module's name and any remote switch modules the first UI module controlled were stored on one or more of the underlying switch modules, when the second UI module is docked over the same underlying switches it adopts the name of the first UI module along with control of any remote switch modules the first UI module was configured to control. This allows users to replace or upgrade UI modules over time without needing to name and configure the new device every time.

The UI module may also comprise a variety of sensors including temperature, humidity, ambient light, and motion. The UI module may also comprise a camera capable of capturing live video. In one implementation, a UI module comprises a video camera, ambient light sensor, motion sensor and one or more of an IR light emitter and an IR light detector to communicate directly with one or more switch modules behind the UI module. The UI module may be configured to operate in a variety of modes of operation including: lighting control idle mode, lighting control active mode, security active mode and security idle mode. In security idle mode, the UI module has its user interface disabled but motion sensor active. If motion is detected in the UI module's field of view, the UI module changes to security active mode and the ambient light sensor compares the light level to a threshold. If the light level is below the threshold, the UI module sends an IR data command to the underlying switch modules to turn on and begins capturing video. The captured video may be stored locally on the device or remotely on a server.

As part of the security active mode, the UI module's user interface also illuminates and prompts the user to enter a personal identification number (PIN) to disarm the security active mode. The UI module also sends an IR command to one or more underlying switch modules to turn on and begins a timer. The user must enter the correct PIN before the timer expires otherwise the UI module will activate an alarm. If the correct PIN is entered, the timer and any active alarm are cancelled.

In still another implementation of a UI module, the UI module comprises a radio and antenna capable of communicating directly to the mesh network of switches. In this implementation, certain commands sent over IR in previous implementations may instead be transmitted wirelessly over the mesh network.

Figure 2:
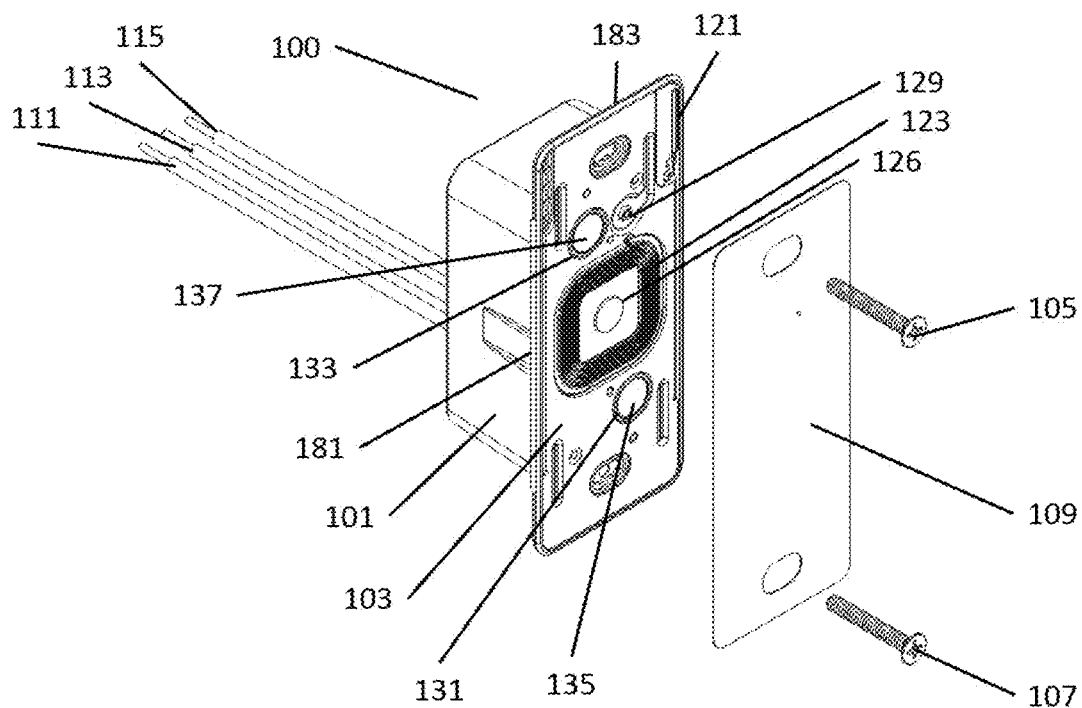
FIG. 2 illustrates a partially exploded angled view of the switch module of FIG. 1.

Referring to the drawings, more clarity is provided about the details of the modular lighting control system. FIG. 1 is an angled view of a switch module 100. The switch module 100 comprises a main housing 101 and front cover 109. A first screw 105 and second screw 107 are used to retain the switch module 100 to a switch box (not shown). The switch module 100 also comprises a plurality of wires 111, 113, 115 for connection of the switch module to a building's existing electrical wiring to draw electrical power and provide switching functionality for a load attached to it. Mechanical snap locations 181, 183 are indicated on the switch module 100 and are used for affixing a wall plate (not shown). An indicator on the front cover 109 shows the position of a tactile switch (not shown) for the user to press to change the mode of the switch module. FIG. 2 shows the same switch module 100 with the front cover 109 exploded in the view to expose additional components. A wireless power transmission coil 123 is configured to transmit power wirelessly through the front cover 109. Positioned inside the center of the wireless power transmission coil 123 is an IR light transmissive window 126. Behind the front cover 109 there are two magnets 135, 137 surrounded by two ferrous steel shrouds 131, 133 on all sides other than the side facing the front cover 109. An antenna 121 is also present behind the front cover 109.

Figure 3:
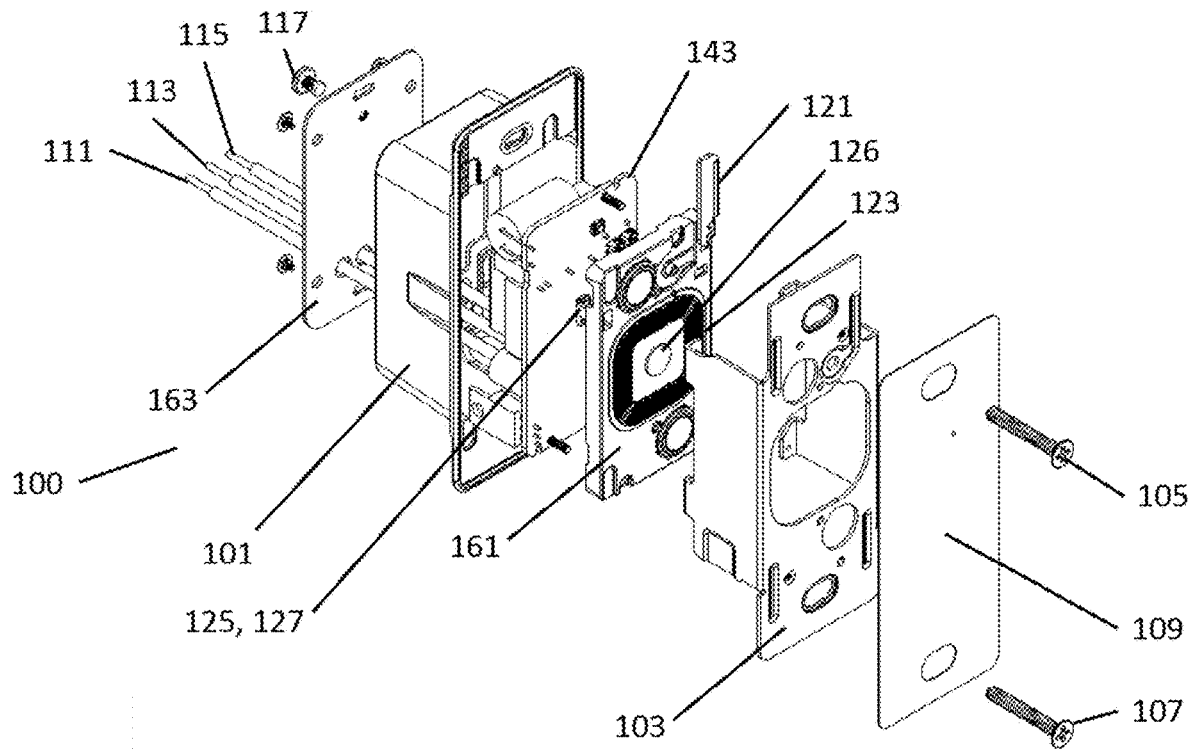
FIG. 3 illustrates a fully exploded angled view of the switch module of FIG. 1.

FIG. 3 explodes even more of the switch module 100 exposing additional components including a PCB assembly 143. Positioned behind the IR transmission window is an IR light emitter 125 and an IR light detector 127. In this implementation, the IR light emitter 125 and IR light detector 127 are part of the same physical component. In another implementation, the IR light emitter 125 and IR light detector 127 are positioned within the center of the wireless power transmission coil 123, they may reside elsewhere and still function properly. A front housing 103 is shown and surrounds the wireless power transmission coil 123 in the finished assembly. A rear plate 163 is shown and when fabricated of aluminum functions well as a heatsink. A ground screw 117 is typically attached to the rear plate 163 and is used for grounding the switch to a home's electrical wiring, if needed.

Figure 4:
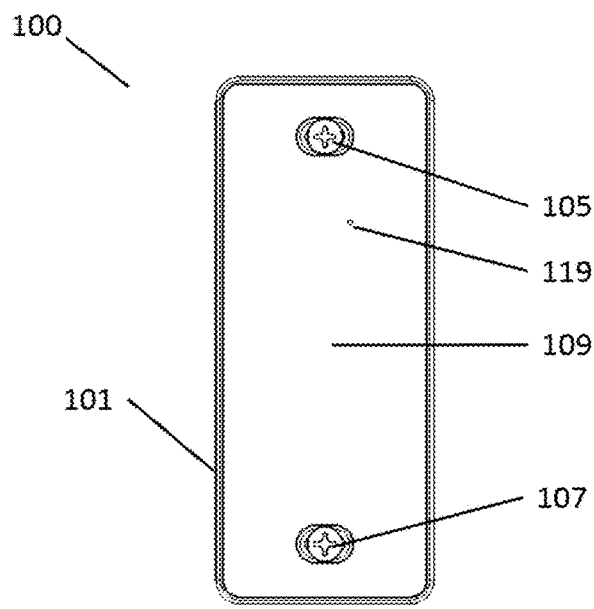
FIG. 4 illustrates a front view of the switch module of FIG. 1.
Figure 5:
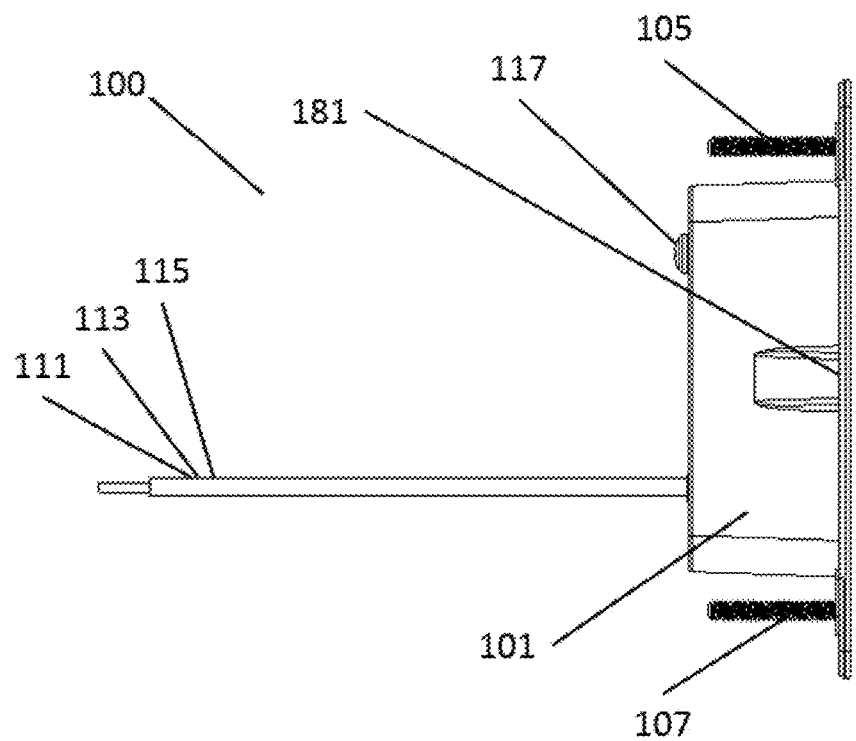
FIG. 5 illustrates a side view of the switch module of FIG. 1.
Figure 6:
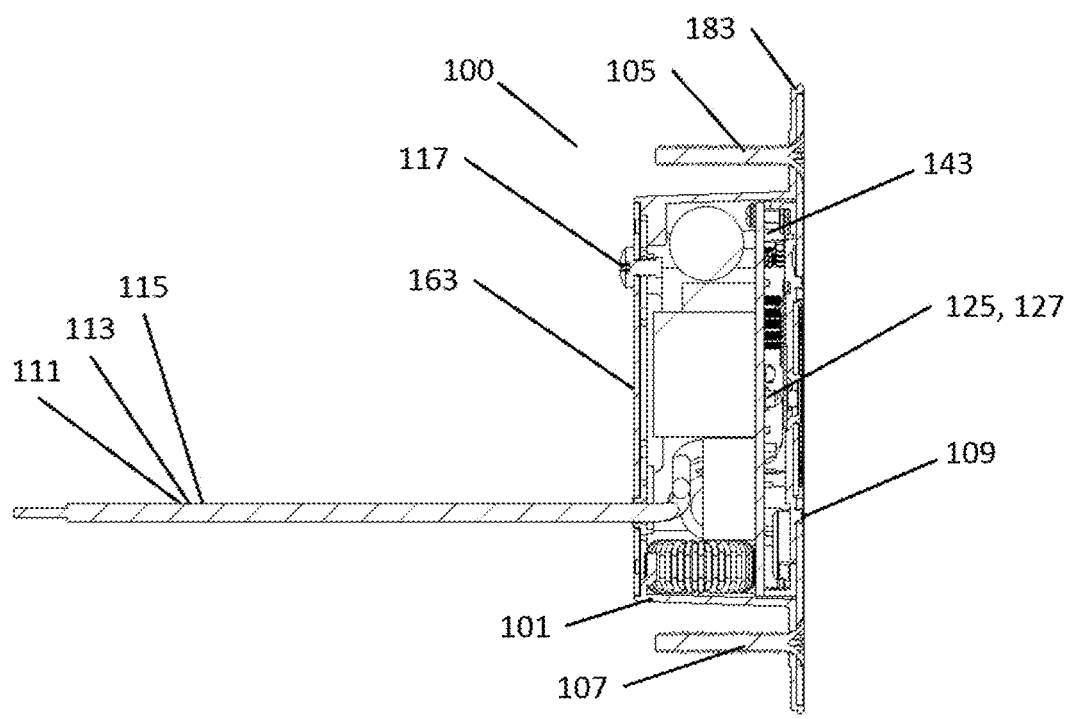
FIG. 6 illustrates a cross-sectional side view of the switch module of FIG. 1 where the section is cut through the centerline of the switch module.

FIG. 4 is a front view of the switch module 100 and highlights that a lip of the main housing 101 surrounds the front cover 109 in the finished assembly. FIG. 5 is a side view of the switch module 100. It should be noted that while this implementation of the switch module 100 comprises discrete wires 111, 113, 115 protruding from the housing 101, other wiring methods common to light switches may be utilized such as conductive screw posts. FIG. 6 depicts a cross-section cut down the center of the switch module 100, through the center of the screws 105, 107. In this view, we note that the IR light emitter 125 and IR light detector 127 are positioned behind the front cover 109. To allow IR light to pass through it, the front cover 109 is made of an IR translucent material over the area of the IR light emitter 125 and IR light detector 127.

Figure 7:
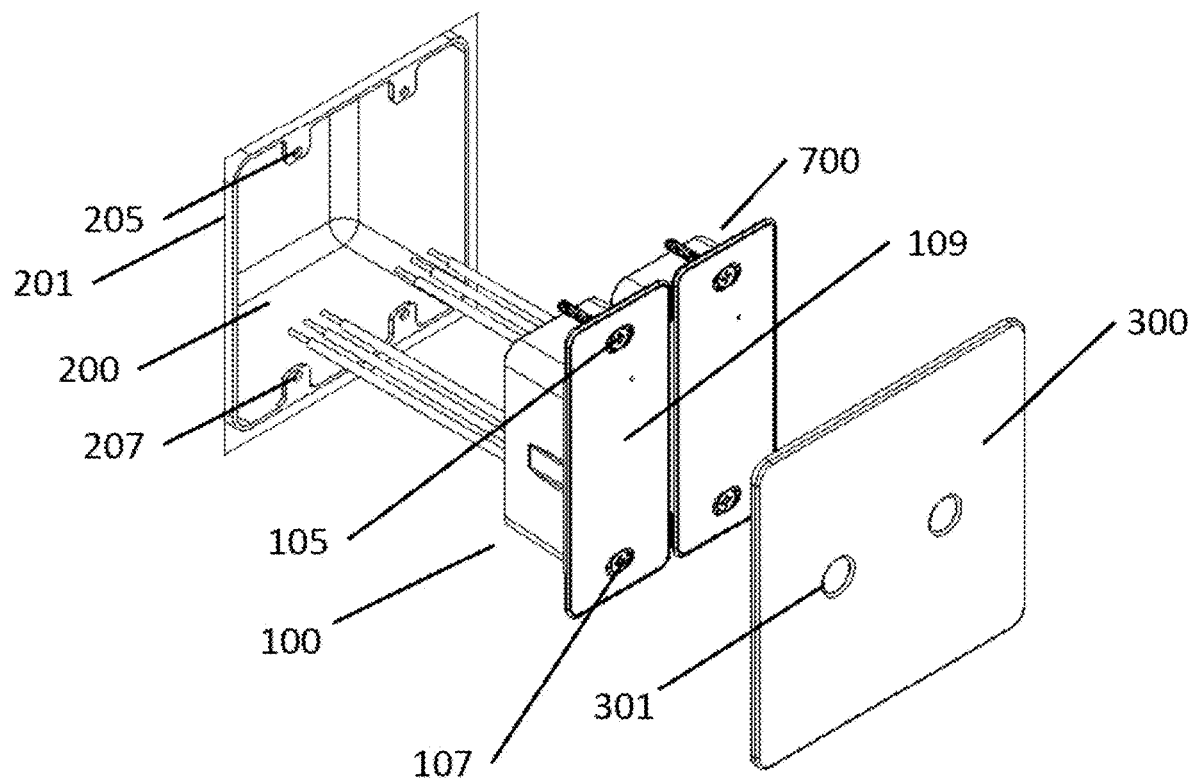
FIG. 7 illustrates an exploded angled view of an assembly in which the switch module of FIG. 1 is assembled to a switch box and covered by a two position wall plate.

FIG. 7 is an angled view of a switch module 100 assembly into a switch box 200 with a wall plate 300 covering the finished installation. The switch box 200 has threaded holes 205, 207 to retain the switch module 100 using screws 105, 107. In typical applications, the switch box 200 is surrounded by building material 201 such as drywall. As shown, two switch modules 100, 700 are installed into the same switch box 200. The switch modules 100, 700 may be identical or have functional variations such as the ability to dim a light. The wall plate 300 includes a cutout 301 centered over the IR light emitter 125 (not shown) and IR light detector 127 (not shown) to help direct a user to the appropriate area to touch to operate the switch module 100.

Figure 8:
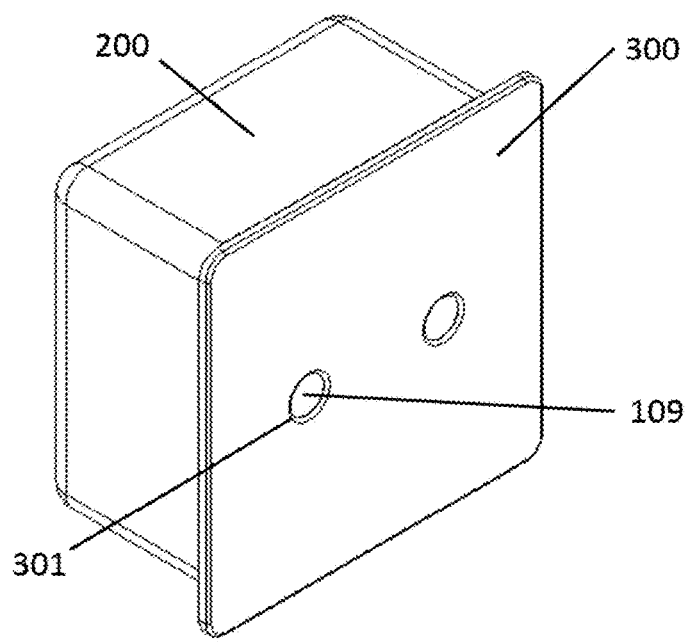
FIG. 8 illustrates an angled view of the assembly of FIG. 7.

FIG. 8 is a view of the switch module 100 assembly in a switch box 200 with the wall plate 300 seated over the switch modules 100, 700 and the switch box 200. The building material 201 from FIG. 7 is omitted in this view to show the switch box 200. The front cover 109 of the switch module 100 is directly behind the wall plate 300 such that the cutout 301 in the wall plate 300 exposes the front cover 109.

Figure 9:
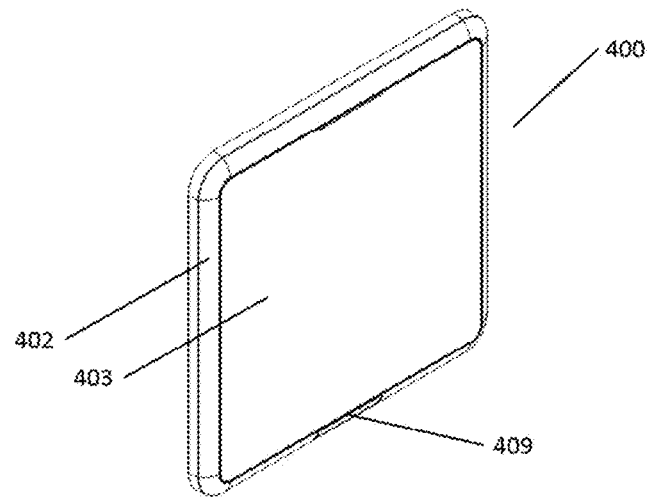
FIG. 9 illustrates an angled view of a user interface (UI) module.
Figure 10:
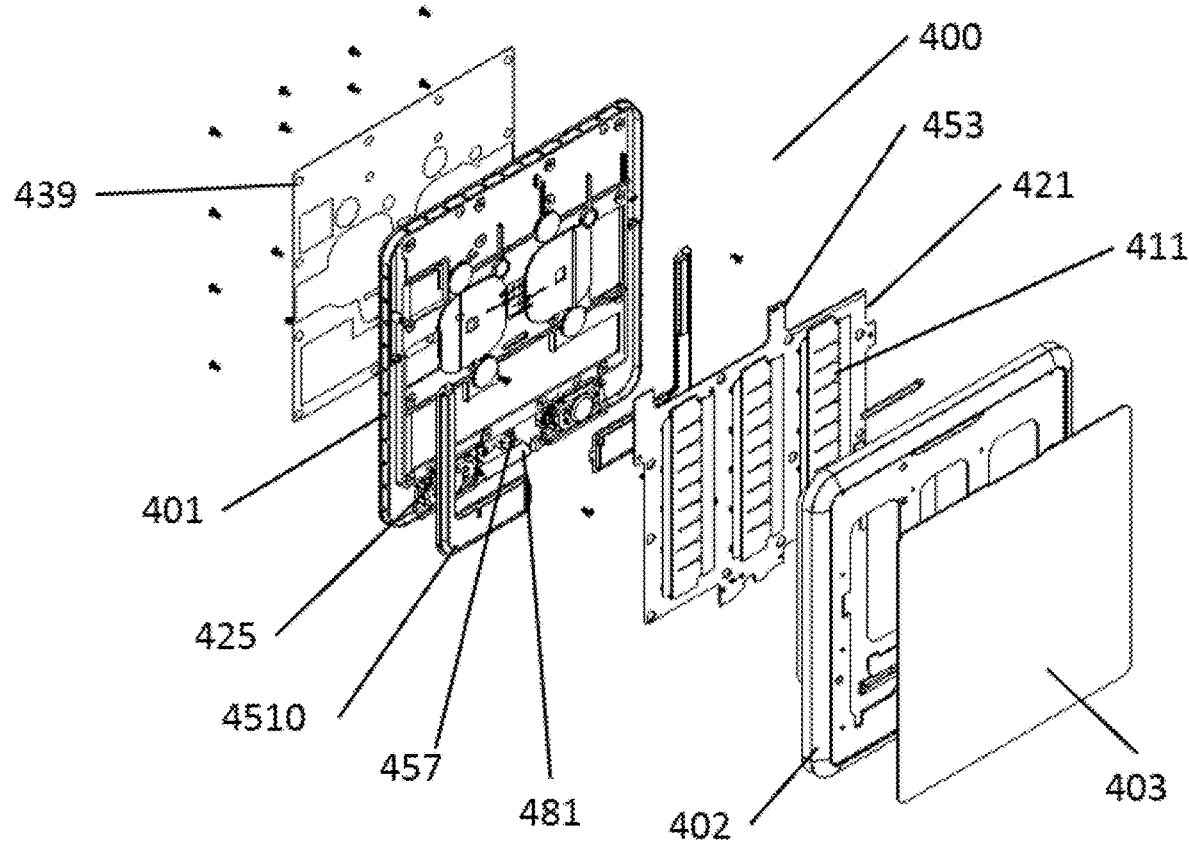
FIG. 10 illustrates an exploded, angled view of the front of the UI module of FIG. 9.

FIG. 9 is an angled view of a UI module 400 intended to dock over a wall plate 300 (not shown). The UI module comprises a lens 403 and front housing 402. A sensor lens 409 is shown in this implementation. FIG. 10 is an exploded view of the UI module 400 and illustrates additional components. An infrared motion sensor 457 is oriented towards a mirror 481 to direct the light from the sensor lens 409 (not shown) towards the IR motion sensor 457. A speaker 425 is located within an acoustic housing 4510 and connected to a PCB assembly 421. The PCB assembly 421 also comprises a plurality of LEDs (not shown) and touch sensors (not shown). To diffuse the light emitted by the LEDs, a light guide assembly 411 is implemented as molded plastic, film sheets or other known technologies. A rear cover 439 attaches to the rear housing 401.

Figure 11:
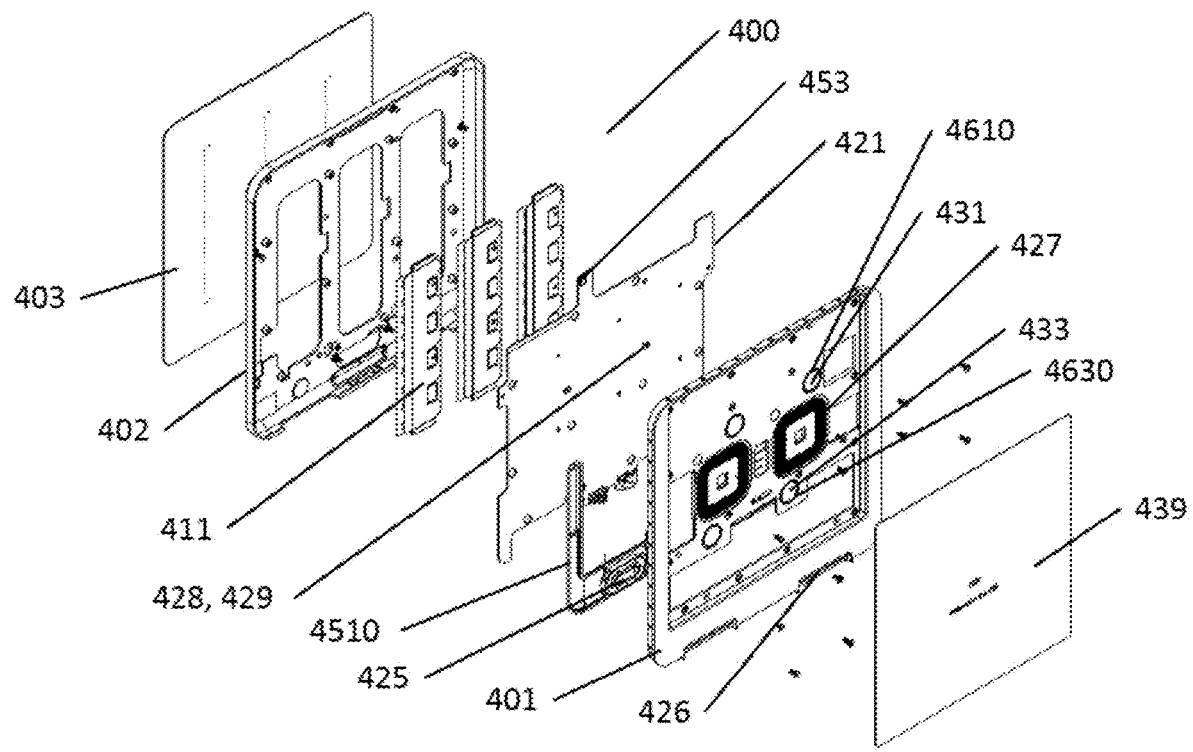
FIG. 11 illustrates an exploded, angled view of the rear of the UI module of FIG. 9.

FIG. 11 illustrates that the UI module 400 is configured to be docked over a two position wall plate 300 (not shown), thus the components that interface with a switch module 100 (not shown) are replicated to interface with an additional switch module 700 (not shown). The replicated components include a wireless power reception coil 427, retention magnets 431, 433 surrounded by ferrous steel shrouds 4610, 4630, an IR light emitter 428 and an IR light detector 429. The IR light emitter 428 and IR light detector 429 may be integrated into the same physical component. The IR light emitter 428 and IR light detector 429 are configured to operate through the rear cover 439 so the rear cover 439 is produced with an IR transparent material over the area of the IR light emitter 428 and IR light detector 429 to allow IR light to pass freely through it. The PCB assembly 421 includes the IR light emitter 428, IR light detector 429 and a microphone 453. An audio port 426 is formed in the rear housing 401 and provides a means for a user to remove the UI module from the wall plate 300 (not shown) when mounted against a wall 201 (not shown).

Figure 12:
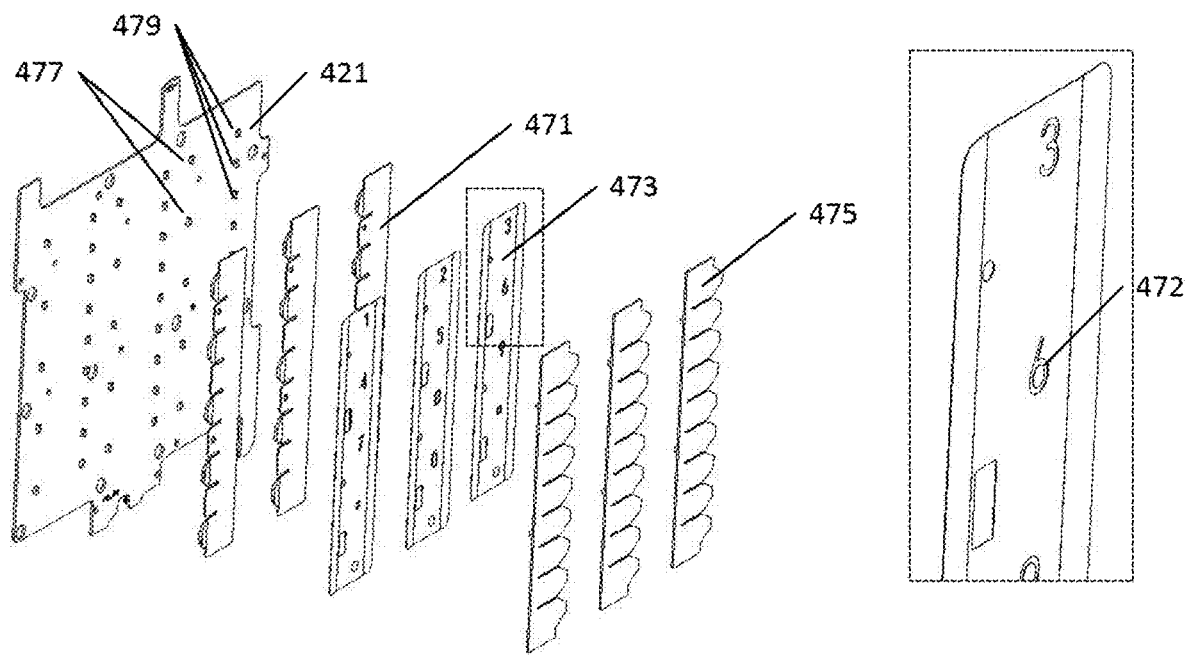
FIG. 12 illustrates an exploded, angled view of the front of a printed circuit board (PCB) assembly of the UI module of FIG. 9.

FIG. 12 is an exploded view of the light guide assembly 411 illustrating a top light guide 475, reflector mask 473 and bottom light guide 471 which assemble to the PCB assembly 421. Connected to the PCB assembly 421 are a first set of LEDs 477 and a second set of LEDs 479. The reflector mask 473 may be an opaque film with physical cutouts or a clear film with opaque printing to form the masked regions. An enlarged view of the reflector mask 473 shows an implementation of a clear printed film. The reflector mask 473 comprises opaque ink printed on the clear film in all areas other than the clear regions 472 which create clear numerals or other icons.

Figure 13:
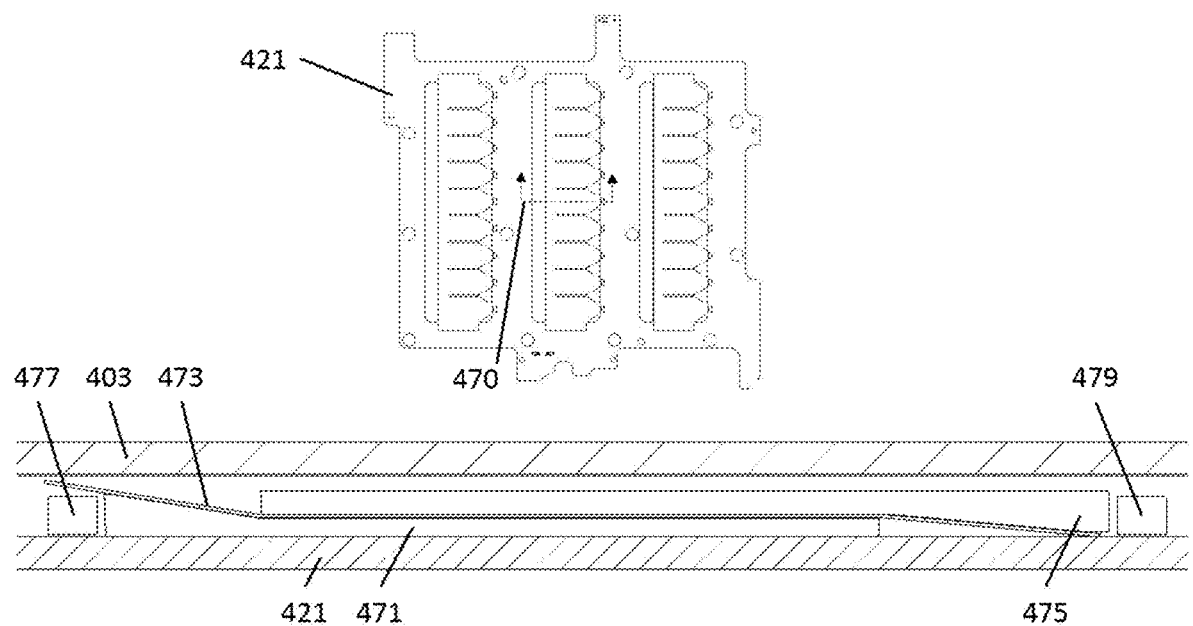
FIG. 13 illustrates a cross-sectional bottom view of the PCB assembly of FIG. 12 where the section is cut through the plane indicated by the dotted line on the PCB assembly.

FIG. 13 illustrates a cross-section of the PCB assembly 421 cut through the plane indicated by the dotted line 470. The first set of LEDs 477 align to edges of the bottom light guide 471 and the second set of LEDs 479 align to edges of the top light guide 475. When the light guide assembly 411 is attached to the PCB assembly 421 the PCB assembly 421 is capable of producing two different modes of lighting using the two different sets of LEDs 477, 479. When the first set of LEDs 477 are enabled, illuminate the bottom light guide 471. However, most of the bottom light guide 471 is masked by the reflector mask 473 such that the illuminated bottom light guide 471 is only visible through the clear regions 472 for the reflector mask 473. In another mode of operation, the second set of LEDs 479 are enabled and illuminate the top light guide 475. When the PCB assembly 421 is placed in the UI module 400 (not shown) it resides behind the lens 403. The lens may comprise printed artwork such that the lens provides an additional masked pattern that allows light to be emitted only in certain areas. The masked area of the lens 403 is larger than the clear regions 472 of the reflector mask 473 such that the light emitted from the reflector mask 473 is always visible through the lens 403. Thus, when the second set of LEDs 479 are powered and the first set of LEDs 477 are unpowered, the unmasked areas of the lens 403 are illuminated but when the first set of LEDs 477 are powered and the second set of LEDs 479 are unpowered, the clear regions 472 of the reflector mask 473 are illuminated. It should be noted that the PCB assembly 421 may comprise a printed white ink on the surface of the PCB positioned underneath the light guide assembly 411 such that when the first set of LEDs 477 are powered, the printed white ink on the PCB reflects the light emitted by the first set of LEDs 477 into the bottom light guide 471. Similarly, the reflector mask 473 may have a white or reflective color so that when the second set of LEDs 479 are powered, the reflector mask 473 reflects the light emitted by the second set of LEDs 479 into the top light guide 475.

Figure 14:
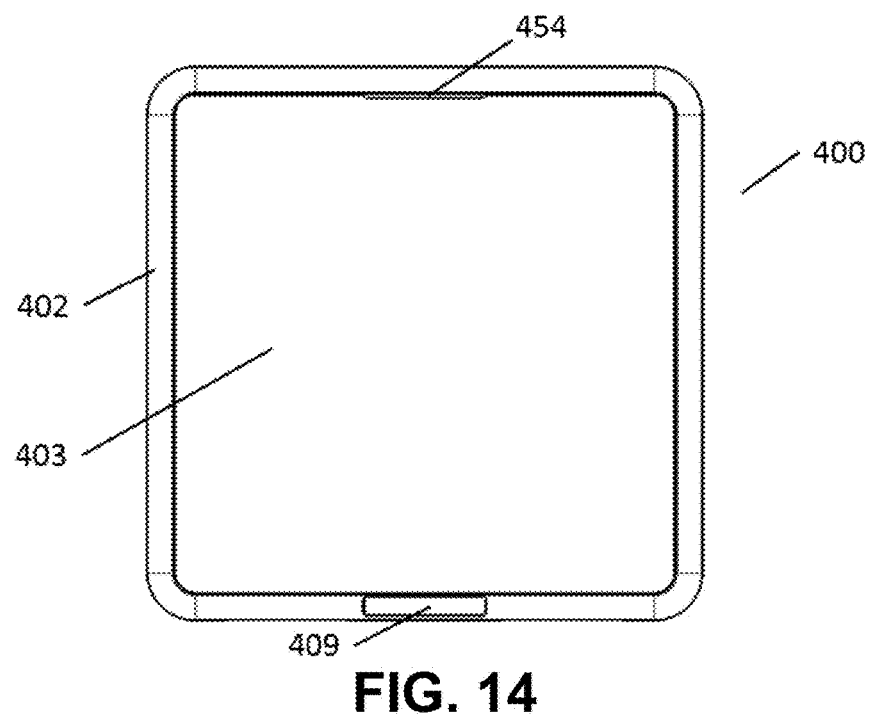
FIG. 14 illustrates a front view of the UI module of FIG. 9.
Figure 15:
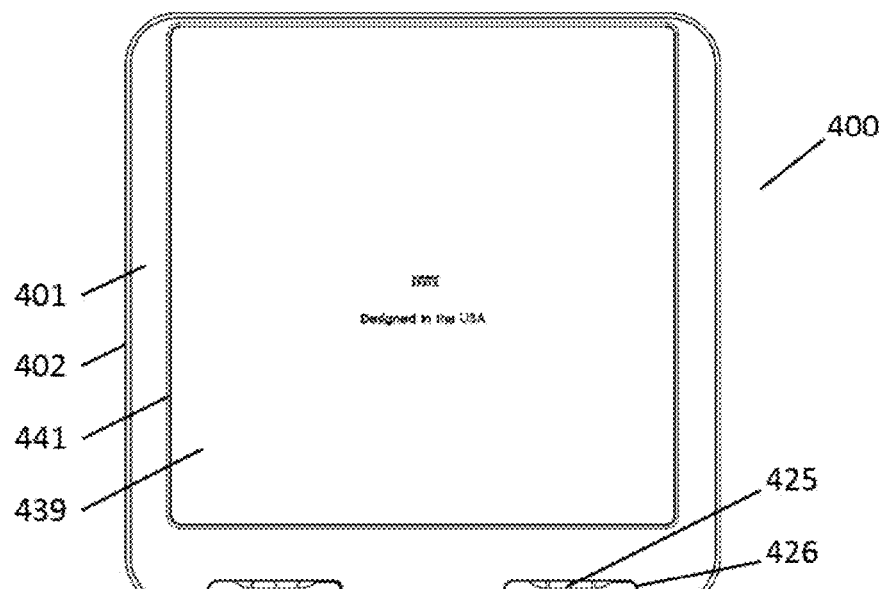
FIG. 15 illustrates a rear view of the UI module of FIG. 9.
Figure 16:
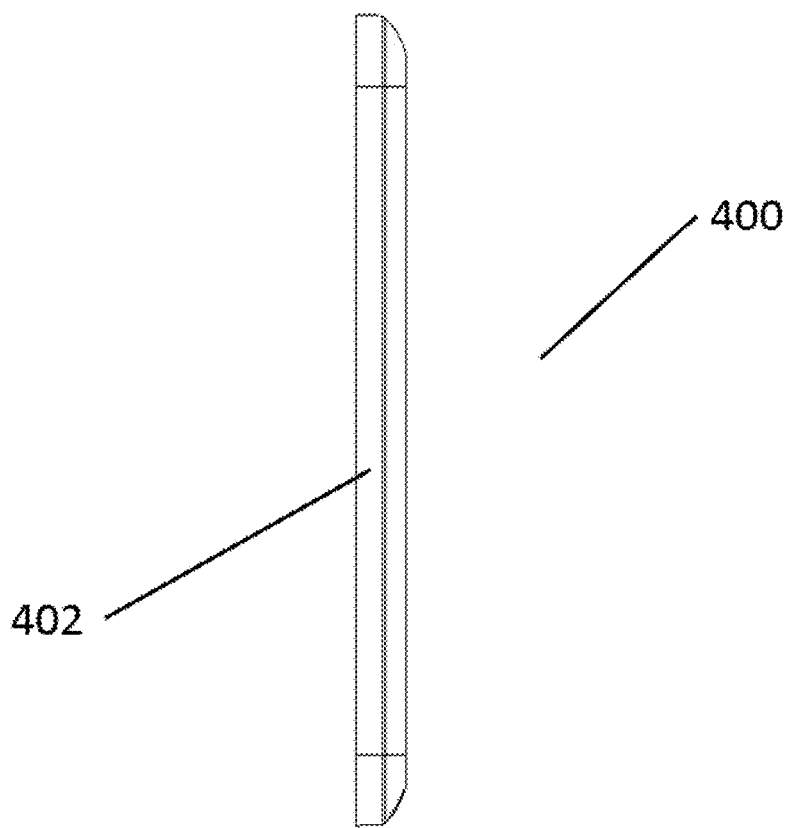
FIG. 16 illustrates a side view of the UI module of FIG. 9.
Figure 17:
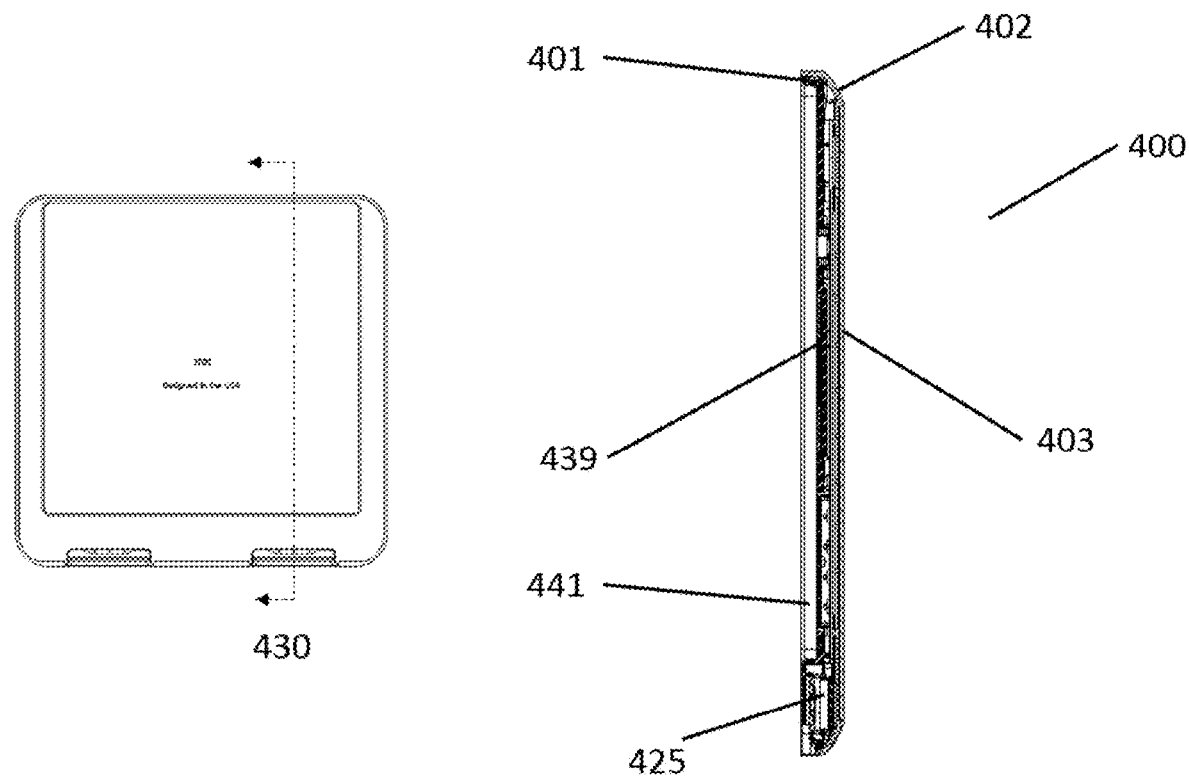
FIG. 17 illustrates a cross-sectional side view of the UI module of FIG. 9 where the section is cut through the plane indicated by the dotted line on the UI module.

The UI module 400 is shown in a front view in FIG. 14 which illustrates that the lens 403 comprises the majority of the front surface area of the UI module 400 with a lip of front housing 402 surrounding it. The sensor lens 409 is shown residing within the front housing 402 while an audio port 454 is shown at an edge of the lens 403. FIG. 15 is a back view of the UI module 400 and shows a recessed area 441 of the UI module 400. The rear cover 439 is located inside this recessed area 441. FIG. 16 is a side view of the UI module 400. In FIG. 17, the side view of FIG. 16 is cross-sectioned down the centerline of a switch position of the UI module 400. It better illustrates the recessed area 441 formed by the housing 401.

Figure 18:
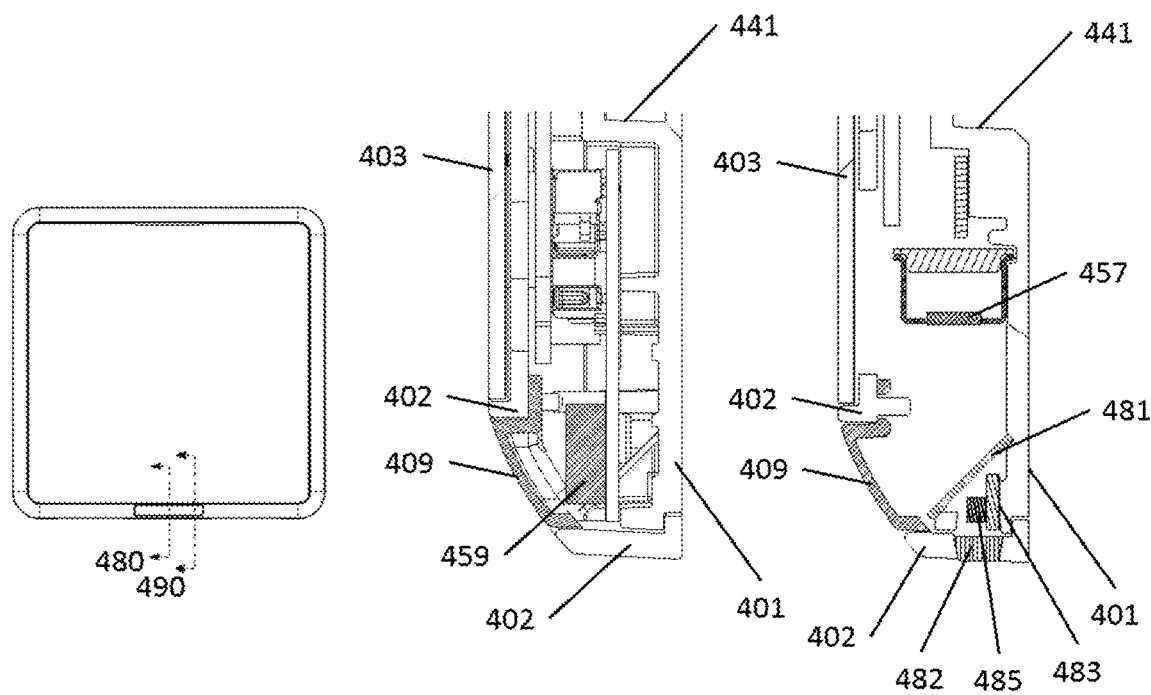
FIG. 18 illustrates additional cross-sectional views of infrared sensors of the UI module of FIG. 9 where the sections are cut through the planes indicated by the dotted lines on the UI module.

The UI module 400 may comprise a variety of sensors and other features. In FIG. 18, two cross-sections 480, 490 are shown. In section 480, a motion sensor 457 is shown along with an LED 485. In this implementation, the motion sensor 457 is a passive infrared (PIR) sensor. Separating the motion sensor 457 and LED 485 is a mirror 481. The sensor lens 409 is visible in this cross section as well. An LED lens 482 resides in front of the LED 485 and the LED 485 is attached to an LED PCB 483. Since the motion sensor 457 operates best when a certain focal length between the motion sensor 457 and sensor lens 409 is maintained, typical PIR motion sensors require a substantial device thickness to achieve the desired focal length. Rather than add thickness to the UI module, the PIR sensor 457 is not positioned directly behind the sensor lens 409 and instead is directed towards the mirror 481. The mirror 481 reflects the infrared light transmitted through the sensor lens 409 towards the PIR sensor 457 achieving the desired focal length without increasing device thickness. The mirror 481 also acts as a reflector and light blocker for the LED 485. The LED 485 light output is directed towards the LED lens 482 but a portion of the light output may be reflected internally within the UI module 400. The mirror 481 helps to reflect some of the light output trapped internally in the UI module 400 back out the LED lens 482 and also prevents any of the light output from travelling through the sensor lens 409.

In section 490, a presence detector 459 is shown. In one implementation the presence detector is a thermal infrared (TIR) sensor. The presence detector 459 is used for detecting proximity of a user to the UI module 400. It resides behind the sensor lens 409 such that infrared light can freely pass between the environment and the presence detector 459. The presence detector 459 has a predetermined range and field of view which covers many but not all types of user approaches to the UI module. In addition to the use of a dedicated presence detector 459, one or more capacitive proximity sensors is employed to supplement the presence detector 459. If a user reaches around a wall to interact with the UI module, his or her hand may avoid detection by the presence detector but the capacitive proximity sensors will detect the hand approaching.

Figure 19:
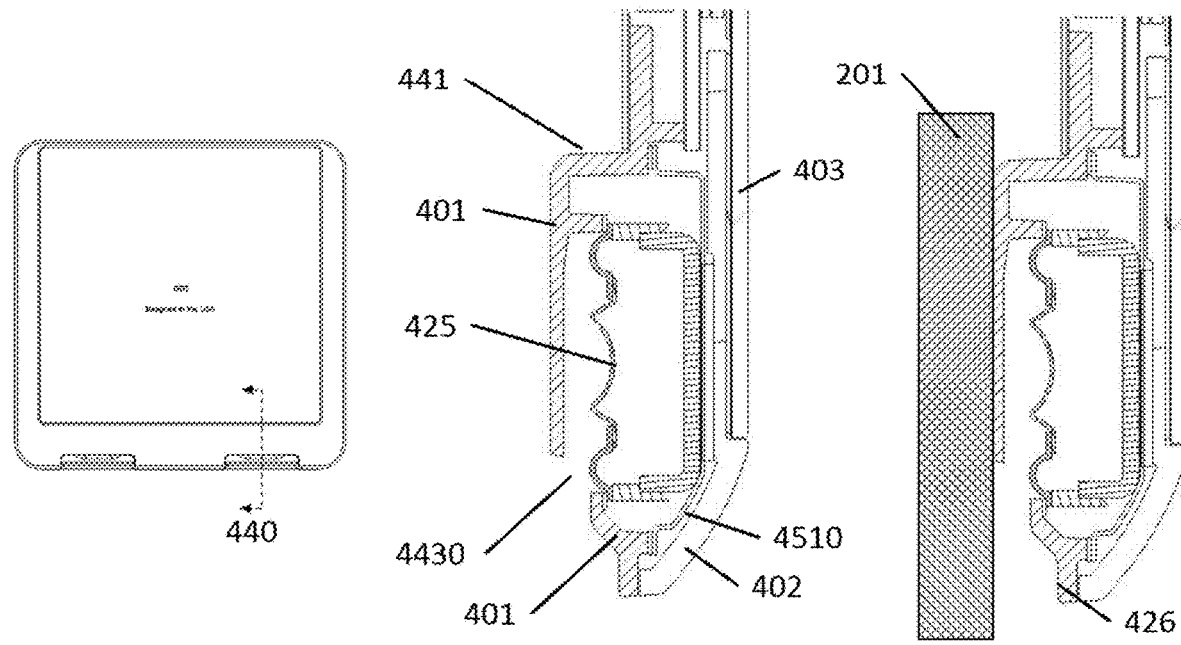
FIG. 19 illustrates additional cross-sectional views of a speaker of the UI module of FIG. 9 where the sections are cut through the plane indicated by the dotted line on the UI module.

FIG. 19 illustrates a cross-section 440 through a speaker 425 of the UI module 400. The speaker 425 resides in a sealed chamber created by the rear housing 401 and acoustic housing 4510. The speaker 425 is assembled to the UI module 400 such that it faces the rear housing 401. The perimeter of the speaker 425 is sealed directly to the rear housing 401. A speaker port 4430 in the rear housing 401 directs the audio output of the speaker 425 out the rear of the UI module 400 against the wall 201 and through the audio port 426.

Figure 20:
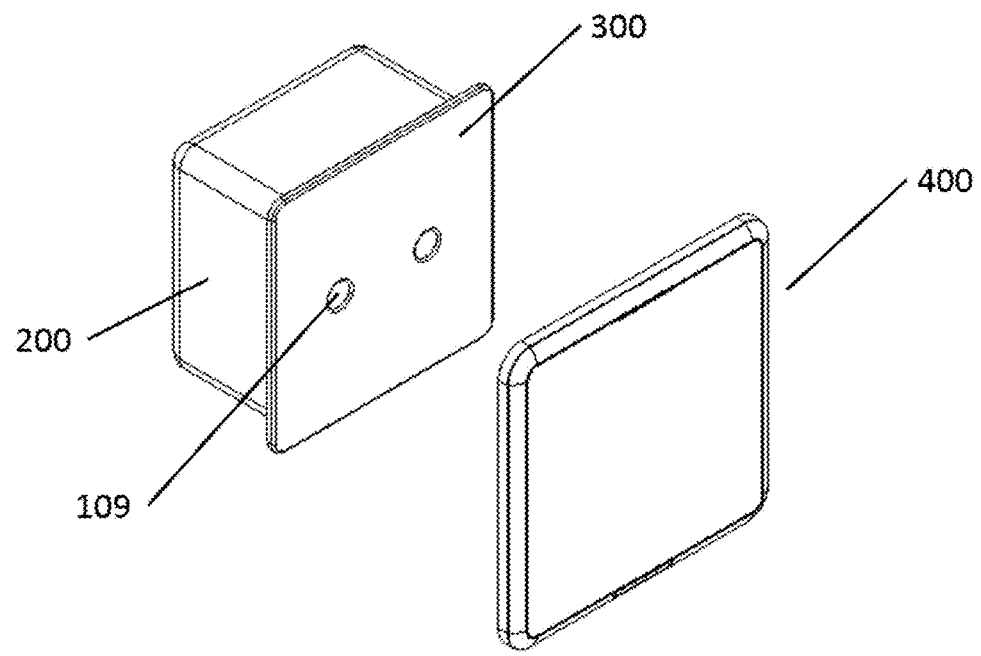
FIG. 20 illustrates an exploded angled view of an assembly of the UI module of FIG. 9 being docked to the assembly of FIG. 7.
Figure 21:
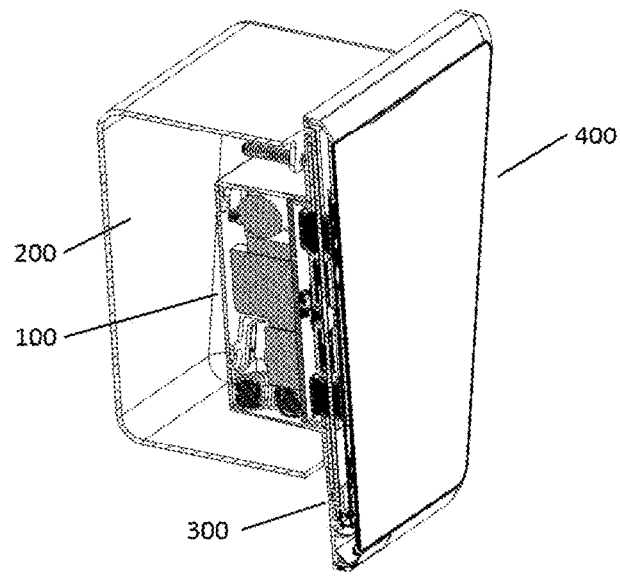
FIG. 21 illustrates an angled cross-sectional view of the assembly of FIG. 8 with the UI module of FIG. 9 added and the cross-section cut through the plane formed by the centerlines of the two magnets in the switch module of FIG. 1.
Figure 22:
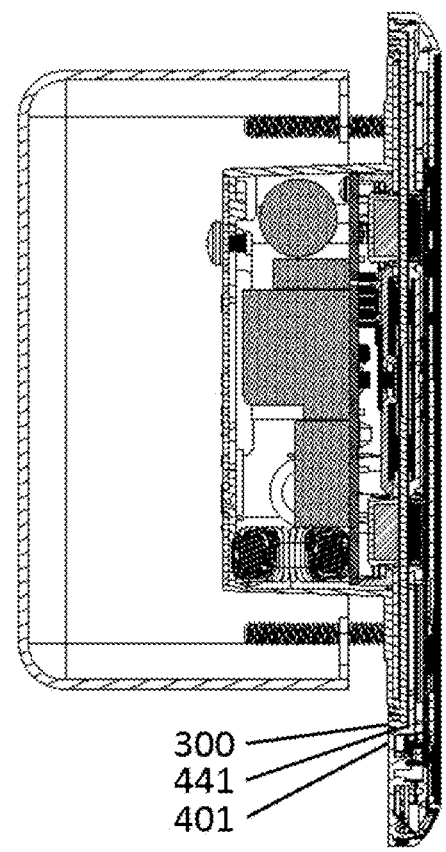
FIG. 22 illustrates a side view of the cross-sectional view in FIG. 21.

FIG. 20 shows the UI module 400 in position to dock over two switch modules 100, 700. FIG. 21 shows the UI module 400 assembled to the assembly of FIG. 8 and cross-sectioned on an angle through the pair of magnets 135, 137 in the switch module 100. FIG. 22 is a side view of the same cross section shown in FIG. 21. FIG. 22 shows how the recessed area 441 of the housing 401 of the UI module 400 locates to the outer edges of the wall plate 300. This, in turn, accurately locates the UI module 400 to the underlying switch modules 100, 700. This alignment is especially critical for components that need to interact between the switch module 100 and the UI module 400.

Figure 23:
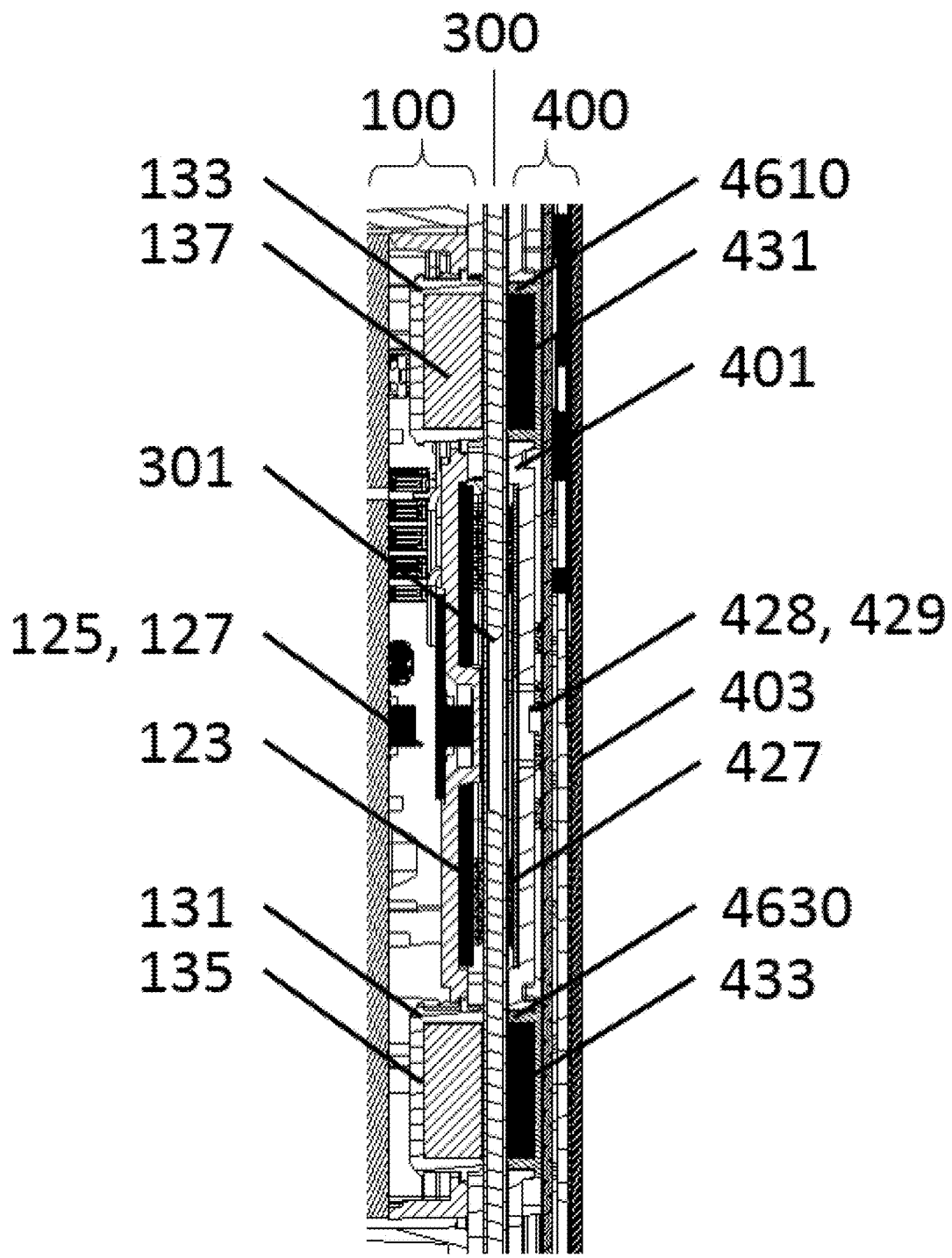
FIG. 23 illustrates an enlarged side view of the cross-sectional view in FIG. 21.

FIG. 23 is an enlarged view of a portion of FIG. 22. Multiple relationships between the switch module 100 and UI module 400 are shown. First, the magnets 135, 137 and ferrous steel shrouds 131, 133 in the switch module 100 are located opposite the magnets 431, 433 and ferrous steel shrouds 4610, 4630 of the UI module to provide a magnetic retention force. In addition, the wireless power transmission coil 123 in the switch module 100 is aligned with and in close proximity to the wireless power reception coil 427. Finally, the IR light emitter 125 and IR light detector 127 of switch module 100 are positioned opposite from and aligned with the IR light detector 429 and IR light emitter 427 of the UI module 400.

Figure 24:
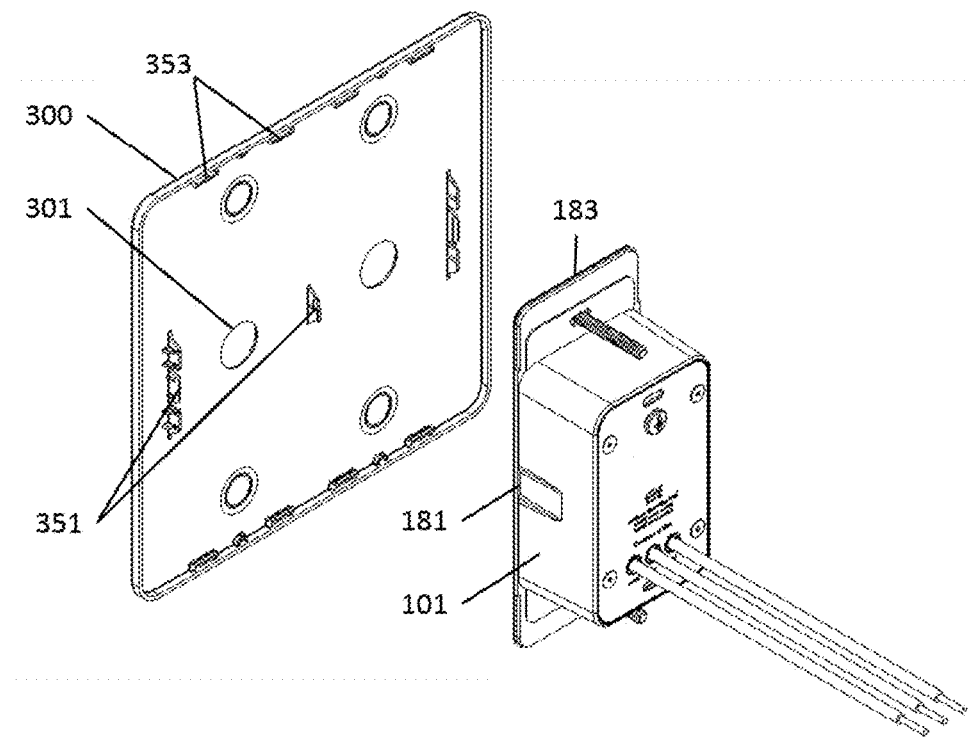
FIG. 24 illustrates an angled rear view of the wall plate of FIG. 7 and switch module of FIG. 1.

FIG. 24 is a rear angled view of the wall plate 300 positioned to snap onto a switch module 100. The wall plate 300 is intended to snap over two switch modules 100, 700 but only a single switch module 100 is shown for added detail and clarity. The switch module 100 comprises a side snap 181 and a symmetric side snap (not shown) as well as a top snap 183 and a symmetric bottom snap (not shown). The switch module snaps 181, 183 interface with side snaps 351 and top snaps 353 on the wall plate 300.

Figure 25:
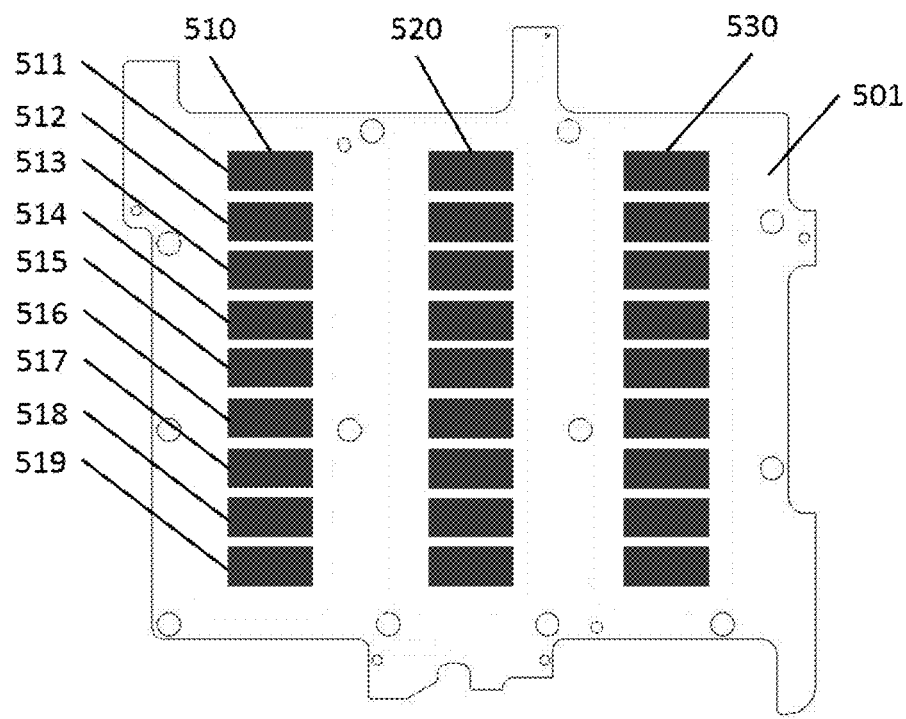
FIG. 25 illustrates a front view of the PCB of the UI module of FIG. 9 highlighting touch sensor segments embedded in one or more of the conductive layers of the PCB.

FIG. 25 illustrates the PCB 501 of the PCB assembly 421 comprising three sets 510, 520, 530 of touch sensors 511, 512, 513, 514, 515, 516, 517, 518, 519. Each set 510, 520, 530 is connected to a touch controller. In a first mode of operation, the touch sensors 511, 512, 513, 514, 515, 516, 517, 518, 519 are configured to report a linear position of a touch over any of the sensors. The linear position is mapped to a dimming level of a lighting device. The touch location and dimming level are visually displayed by the second set of LEDs 479. In another mode of operation, a discrete keypad is displayed visually by the first set of LEDs 477. In this mode of operation, touches detected over sensors 511, 513, 515, 517, 519 are mapped to certain keypad or function keys while touches detected over sensors 512, 514, 516, 518 are not recognized touches in this mode of operation. The sets 510, 520, 530 of sensors may also be driven by the touch controller to detect proximity of a user's hand rather than touch in order to supplement the function of the dedicated presence detector 459.

Figure 26:
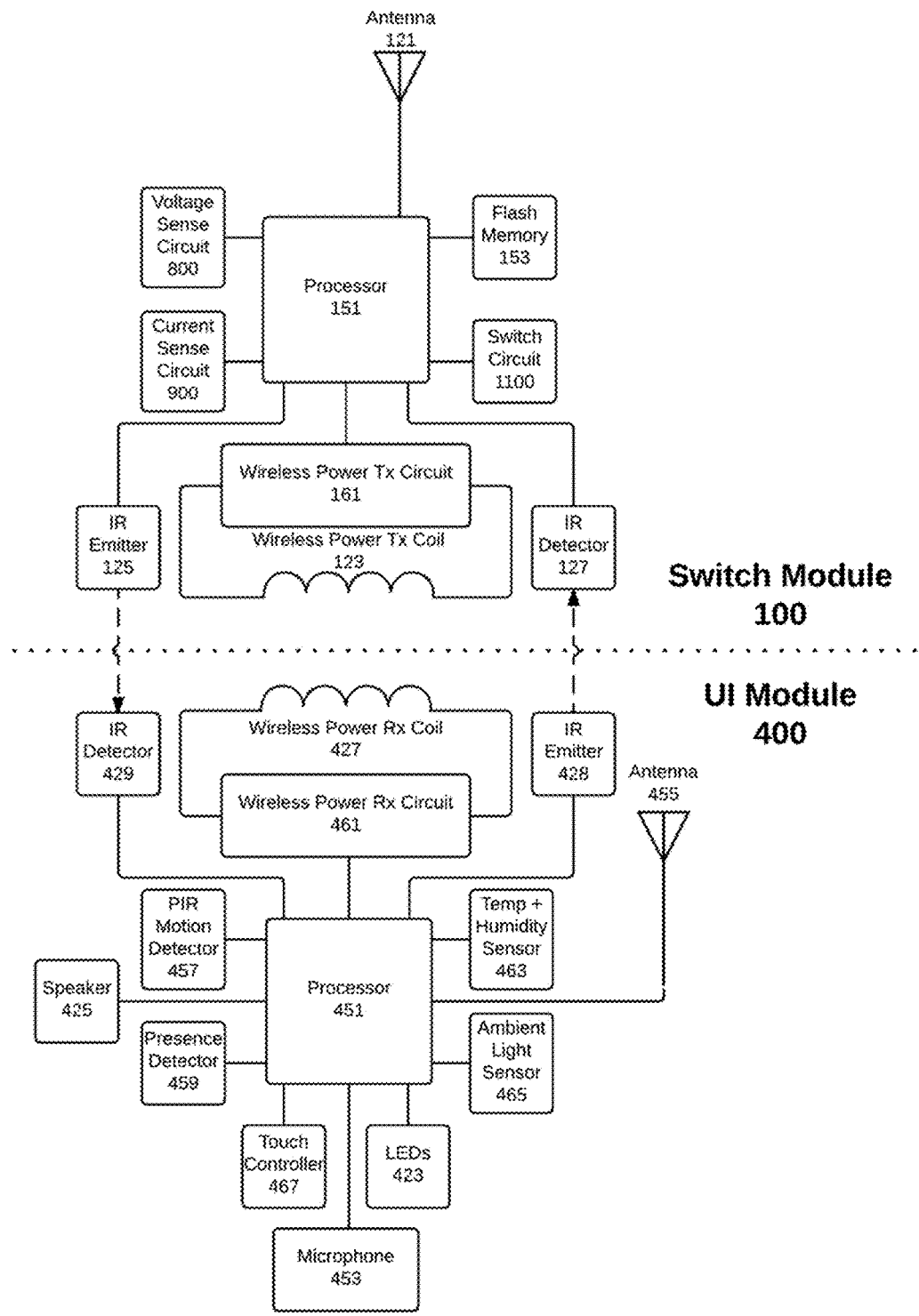
FIG. 26 illustrates a block diagram for a UI module docked to a switch module.

FIG. 26 is a block diagram of both the switch module 100 and the UI module 400. The switch module 100 has a processor 151 which controls many of the functions within the switch module 100. The processor 151 may also comprise its own memory, modem and/or other functions to comprise a "system on a chip" (SoC). The switch module 100 may comprise a Hall Effect sensor (not shown) connected to the processor 151. The switch module 100 also has a wireless power transmission circuit 161 capable of transmitting wireless power through the wireless power Tx coil 123. The processor 151 is also connected to and controls IR emitter 125 and IR detector 127. The switch module 100 may have flash memory 153 external to the processor 151. This may be the only memory in the switch module 100 or it may supplement memory already part of a SoC. The switch module 100 also has an antenna 121 connected to the processor 151. The switch module also comprises a switch circuit 1100 which is connected to the processor 151. The switch circuit 1100 may comprise a relay circuit, a triode for alternating current (TRIAC) circuit, or a mode-selectable circuit that allows a user to choose between use of a relay and a TRIAC for controlling the current delivered to a load. In addition to the switch circuit 1100, the switch module 100 may implement a voltage sense circuit 800 and a current sense circuit 900. These circuits allow the switch module 100 to monitor the power used by the load attached to it.

The UI module 400 of FIG. 26 also comprises a processor 451 similar to that of the switch module 100. Again, the processor 451 may have additional functionality embedded to be considered a SoC. The UI module 400 comprises an antenna 455 which allows two way data communication using protocols such as WiFi. Additional antennas and wireless protocols may be implemented as well but omitted from the illustration for simplification. An IR emitter 428 and IR detector 429 are also part of the UI module 400 and communicate with the IR detector 127 and IR emitter 125 of the switch module 100, respectively. In order to receive power from the wireless power transmission coil 123 of the switch module 100, the UI module 400 comprises a wireless power receiving coil 427 and wireless power reception circuit 461 which provides power to the processor 451. The UI module 400 also comprises a speaker 425 and microphone 453, each connected to the processor 451. LEDs 423 are also part of the UI module 400 and connect to the processor 451. Finally, a variety of sensors connect to the processor 451, including: temperature and humidity 463, ambient light 465, touch 467, presence 459 and motion 457.

For clarity, the UI module of FIG. 26 illustrates just a single wireless power reception circuit 461, wireless power reception coil 427, IR detector 429 and IR emitter 428 interfacing with a single switch module. However, the UI module 400 from FIG. 9 comprises two of each of the foregoing components. In fact, other implementations of the UI module 400 may accommodate an even larger number of switch positions and each position will comprise its own wireless power Rx circuit 461, wireless power Rx coil 427, IR detector 429 and IR emitter 428.

As previously discussed, the UI module 400 may communicate with one or more switch modules using IR detector 429 and IR emitter 428. The UI module may also comprise a wireless networking standard such as IEEE 802.15.4 to participate directly in the same wireless mesh network formed by multiple switch modules 100. Since the UI module also comprises WiFi connectivity, it acts as a link between the mesh network of switch modules and the internet. If a user wishes to add a new switch module to the mesh network, he or she may enter an identification number from the new switch module 100 into a smartphone application which then instructs the UI module over WiFi to search for a device with that identification number broadcasting on the IEEE 802.15.4 network. However, if a UI module 400 is docked over multiple switch modules 100, the user may add just a single identification number from either the UI module 400 or any of the switch modules 100 and the other devices will be automatically added to the same mesh network by transmitting identifying information and/or authorization over the IR communication system.

Figure 27:
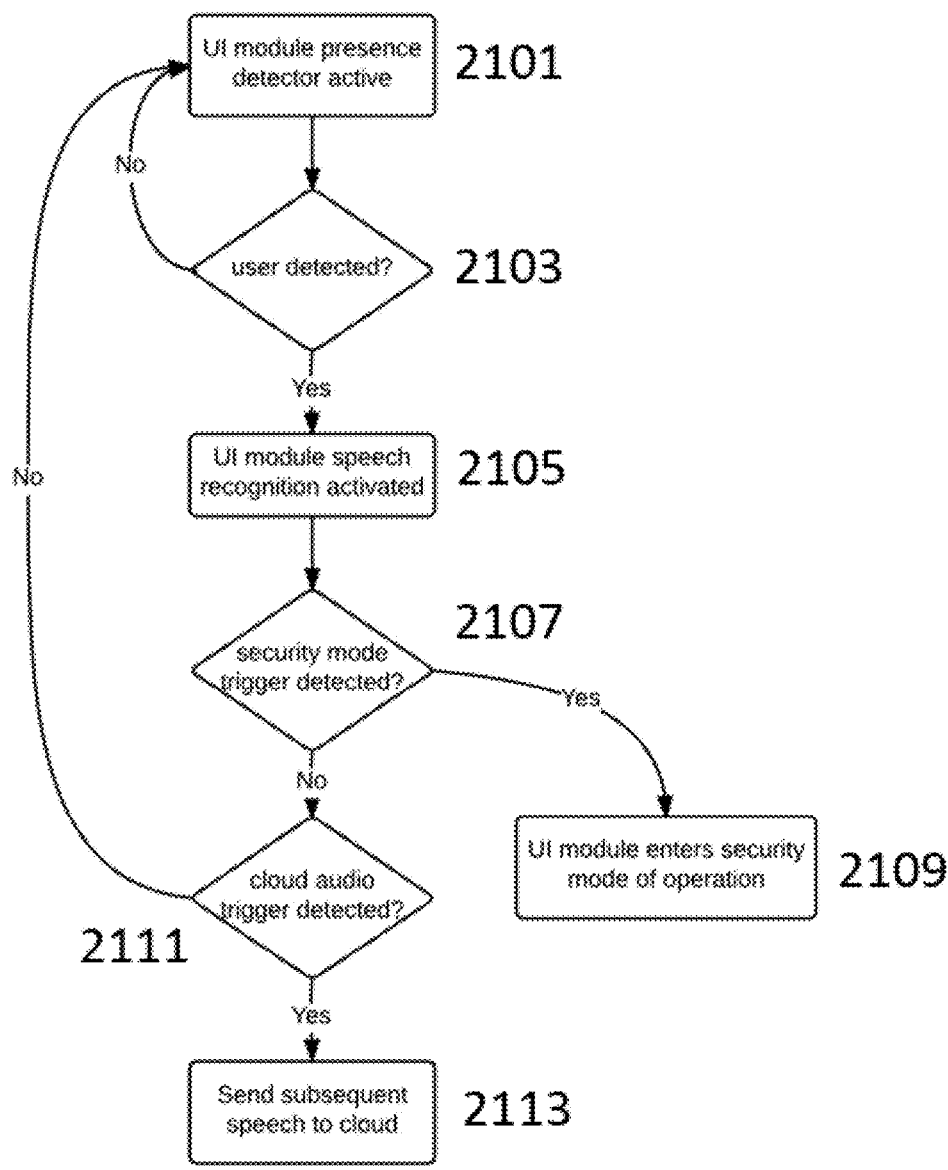
FIG. 27 illustrates a flow chart of speech recognition in a UI module.

FIG. 27 illustrates a flow chart 2100 of a motion-activated speech recognition system integrated in UI module 400. In step 2101, the UI module 400 presence detector 459 is active i. In step 2103, the presence detector 459 remains active until a user is detected. In step 2105, UI module 400 speech recognition is activated. The speech recognized may also be looking for multiple voice triggers. In this implementation, two voice triggers are possible. In step 2107, the speech recognizer listens for a security mode voice trigger like "arm security". In step 2109, if the security mode voice trigger is heard by the speech recognizer, the UI module enters a security mode of operation. In step 2111, if the security mode voice trigger is not heard by the speech recognizer, a cloud audio trigger may be detected. In step 2113, if the cloud audio trigger is heard by the speech recognizer, any subsequent speech is sent to the cloud for processing and action. If no cloud audio trigger is detected, the UI module 400 returns to step 2101 to ensure a user is still present near the UI module 400.

This system is designed so that if a user leaves the detection area of the UI module 400 presence detector 459, the speech recognizer is disabled. This allows multiple UI modules to be installed in a single home but controlling which device is listening via user presence. Additionally, when the speech recognizer hears the security mode voice trigger and the UI module 400 enters a security mode of operation, the speech recognizer no longer listens for human speech and instead listens for noises such as smoke detectors sounding or glass breaking.

In the security mode of operation, the UI module 400 may be capable of using its motion detector 457 to detect unexpected motion within a certain range and field of view. The security motion detection functionality can be enabled or disabled by a user. This is useful if multiple UI modules are installed in a home. For example, UI modules on lower floors may be enabled to detect motion while UI modules on higher floors may be disabled. In such a scenario, even if the motion sensors are disabled for purposes of security, they may still be enabled to detect motion for other purposes. It may be learned over time by UI modules themselves or a cloud-based server and database connected to the UI modules over the internet that in the security mode of operation if motion is detected by one or more UI modules with motion sensors disabled for purposes of security and subsequent motion is detected by UI modules with motion sensors enabled for security the security system may not be triggered since the motion event was caused by users in the house entering the active security zone as opposed to an actual intrusion. Additional logic like time of day, ambient light level or environmental audible noise may factor into the active security zone ignoring certain motion events. The active zone may ignore motion for a certain duration of time or until a motion sensor that is disarmed for security purposes sees a new motion event.

In another implementation, pre-recorded voice commands such as "what's the news today?" or "what's the weather today?" are stored on the UI module 400. A user can use a smartphone application to instruct the UI module 400 to transmit a pre-recorded voice command to the cloud for processing and response based on time of day and motion detection. This allows a user to walk past a UI module 400 early in the morning and without speaking a command, the UI module will respond with the weather forecast for the day from the cloud response to the automatic pre-recorded audio transmission.

In an earlier disclosure, the inventors disclosed a UI module 400 comprising a camera, light sensor, and motion sensor such that in a security mode of operation if the UI module 400 motion sensor was triggered and the light sensor registered an ambient light level lower than a threshold then the switch modules underlying the UI module would be activated such that the room would illuminate for purposes of recording video. However, the underlying switches may not always properly illuminate the view of the camera in the UI module 400. Thus, the inventors further disclose the use of a mesh network of switch modules and one or more UI modules. Over time, the UI module or a cloud service connected to the UI module matches inputs on any switch modules to changes in light detected at the light sensor. This method identifies the switch modules that impact the intensity of light at the UI module to enable the best illumination possible during a video recording.

Figure 28:
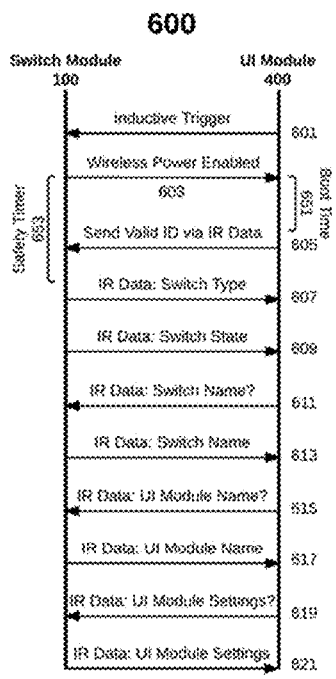
FIG. 28 illustrates an event sequence between a UI module and a switch module.

FIG. 28 illustrates the sequence of events 600 that take place between a switch module 100 and UI module 400 immediately after the UI module 400 is docked to the switch module 100. In step 601, the wireless power receiving coil 427 of the UI module 400 produces an inductance change at the wireless power transmission coil 123 of the switch module 100. The inductance change is detected by the switch module 100. This inductive trigger by the UI module 400 onto the switch module 100 signals the switch module 100 to proceed. In step 603, the switch module 100 enables wireless power transmission. In step 651, the UI module 400 receives enough power to begin booting and fully boots up within a certain period of time, the boot time. In step 653, as soon as wireless power is enabled 603, the switch module begins a safety timer which is designed to always be longer than the boot time of the UI module 400. In step 605, after the boot time has elapsed but before the safety timer has expired, the UI module sends a valid identifier (ID) 605 to the switch module 100 via the IR data link. If no valid ID is received by the switch module 100 before the expiration of the safety timer, then the switch module disables the wireless power transmission. In steps 607 and 609, if the switch module 100 receives confirmation of a valid UI module 400 via IR data, then it sends information back to the UI module including switch type and switch state. Although the sequence of events 600 is shown between a single switch module 100 and single UI module 400, it is to be understood that in practice a single UI module 400 may be undertaking this sequence of events 600 substantially simultaneously with multiple switch modules 100, 700. By receiving the switch type and switch state from all underlying switch modules 100, 700, the UI module 400 has the information needed to display an initial user interface for the underlying switch modules 100, 700 to the user. In step 611, the switch module 100 and UI module 400 are free to begin communicating and sharing information via the IR data link. The UI module 400 may make a series of queries in steps 611, 615, 619 and receive a corresponding series of responses in steps 613, 617, 621 from the switch module 100. Although these interactions are all shown as responses from the switch module 100 in response to requests from the UI module 400, the switch module 100 may also make requests of the UI module 400 and receive responses. The specific sequence and format of queries in steps 611, 615, 619 are illustrative only but show how a new UI module being installed in the location that a previous UI module was installed might adopt the name and settings of the previous UI module.

Figure 29:
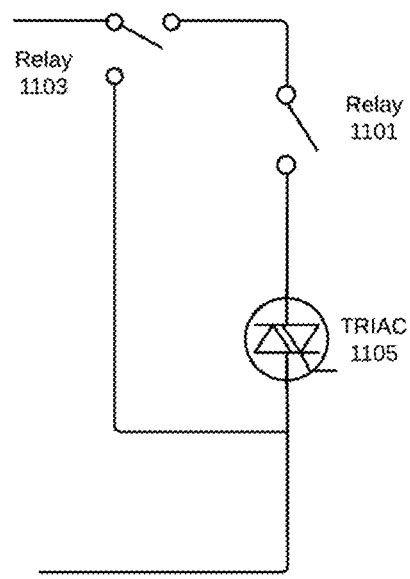
FIG. 29 illustrates a block diagram of a selectable switch circuit.

FIG. 29 illustrates a switch circuit 1100. This implementation employs two relays 1101, 1103 and a TRIAC 1105 to enable either a relay mode of operation or a TRIAC mode of operation. Relay 1103 is considered open when connected to relay 1101 and closed when bypassing relay 1101. If the user wishes to control a load using simple on/off commands, the relay 1101 is open such that if relay 1103 is closed, the circuit is completed through relay 1103 alone. If relay 1103 is opened, the circuit is open. If the user wishes to control a load using dimming functionality, the relay 1103 is opened such that the relay 1101 and TRIAC 1105 control the current to a load. The relay 1101 is open whenever the current to the load is intended to be zero to provide a certain air gap in the switch circuit 1100. If the current to the load is intended to be higher than zero, the relay 1101 is closed and the TRIAC 1105 controls the amount of current provided to the load. Thus, when relay 1103 is open, relay 1101 and TRIAC 1105 control the behavior of switch circuit 1100 to be that of a dimmer switch. In a dimming mode of operation, when the maximum dimming level is reached, relay 1103 may simply be closed to complete the circuit at full brightness. This eliminates significant heat generation compared to using a TRIAC at max brightness. In a dimmer mode of operation at less than full brightness, if a temperature threshold is reached on a thermistor near the TRIAC, the dimmer mode of operation will automatically be disabled and the relay 1103 is closed to complete the circuit at full brightness with less heat generation.

Figure 30:
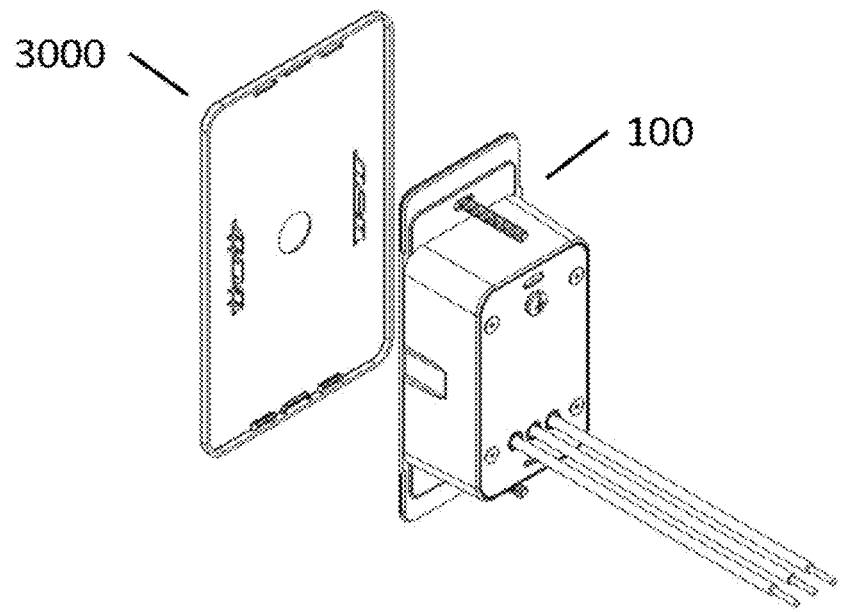
FIG. 30 illustrates an angled rear view of the switch module of FIG. 1 with a single position wall plate.
Figure 31:
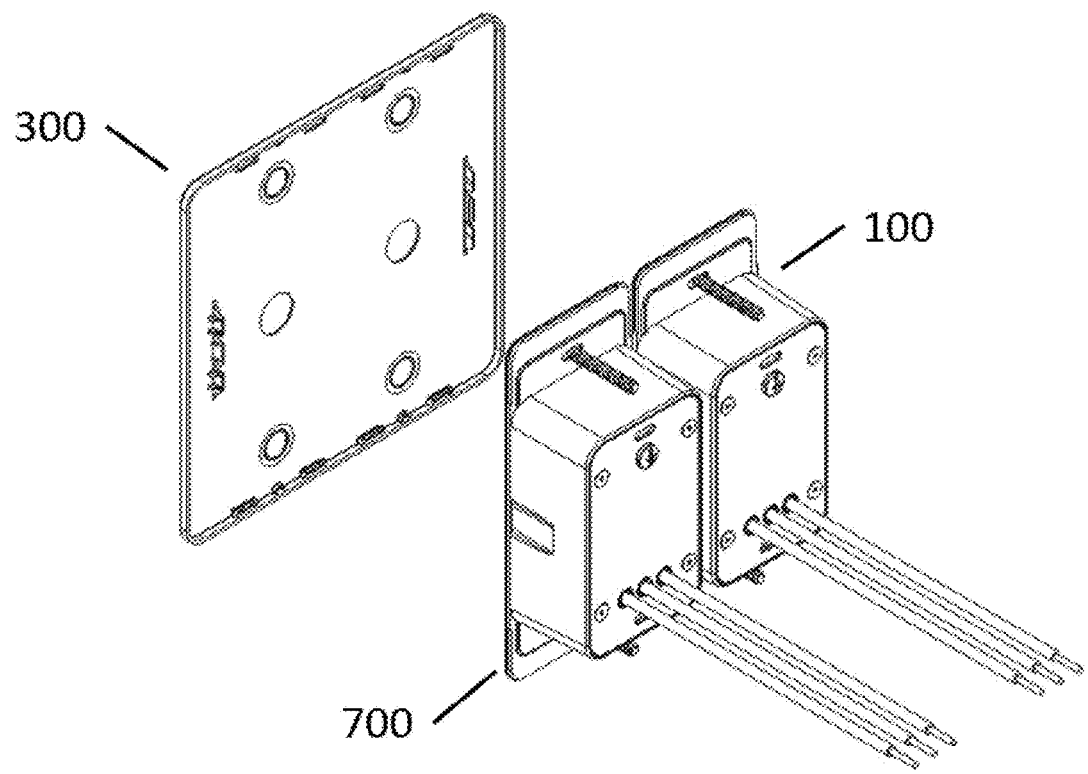
FIG. 31 illustrates an angled rear view of two switch modules with the two position wall plate of FIG. 7.
Figure 32:
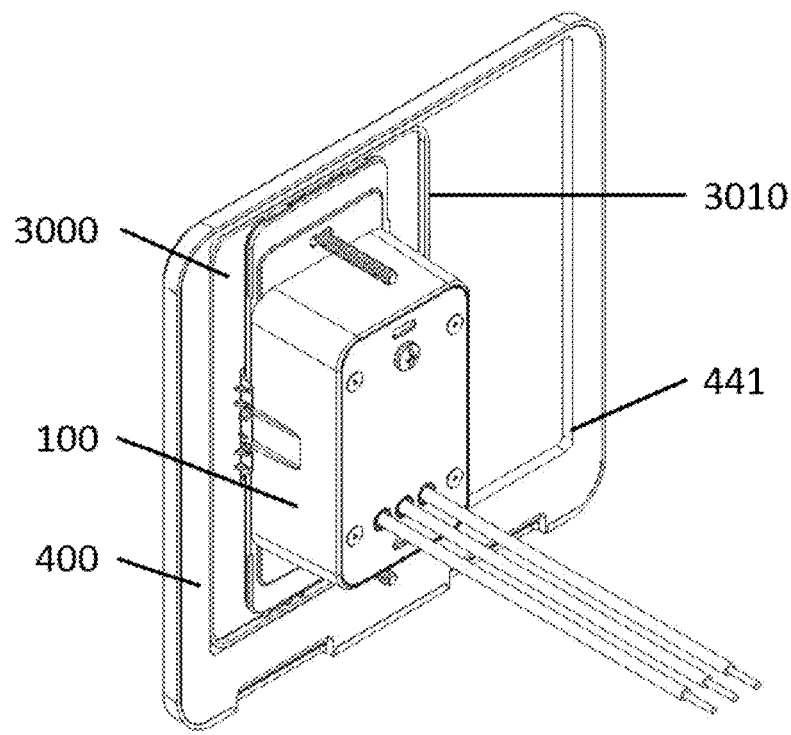
FIG. 32 illustrates an angled rear view of the switch module of FIG. 1, wall plate of FIG. 30 and UI module of FIG. 9 in a first position.
Figure 33:
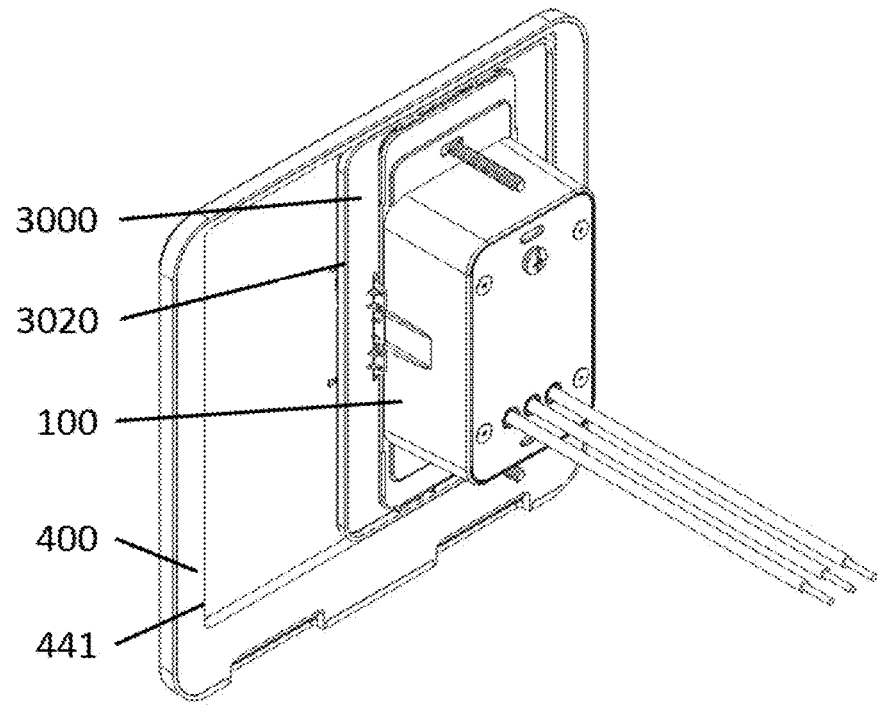
FIG. 33 illustrates an angled rear view of the switch module of FIG. 1, wall plate of FIG. 30 and UI module of FIG. 9 in a second position.
Figure 34:
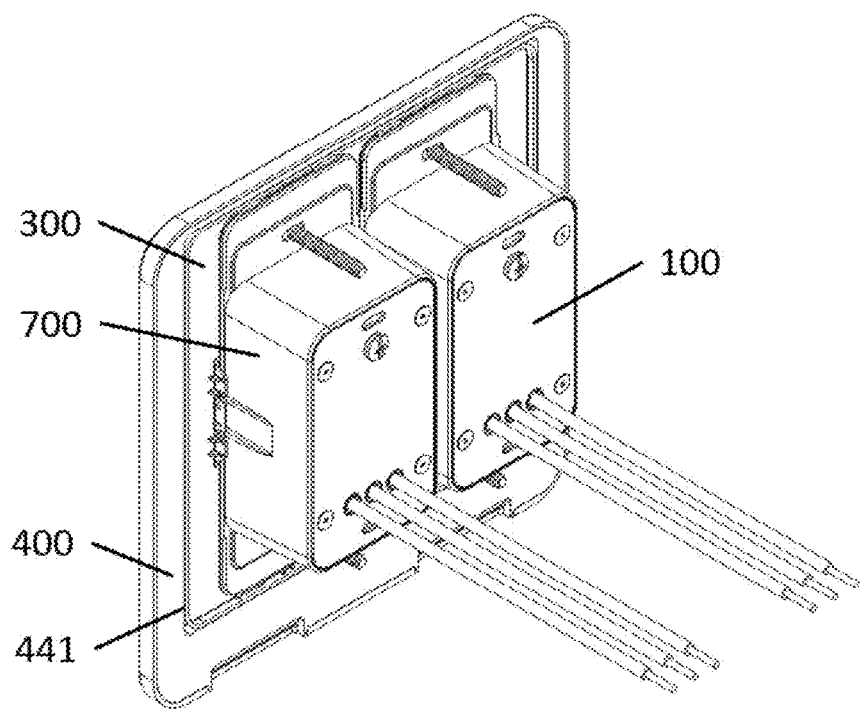
FIG. 34 illustrates an angled rear view of two switch modules, the two position wall plate of FIG. 7 and the UI module of FIG. 9 in a second position.

FIG. 30 illustrates a single position wall plate 3000 designed for attachment to a single switch module 100 while FIG. 31 illustrates the two position wall plate 300 designed for attachment to two switch modules 100, 700. In FIG. 32, the single position wall plate 3000 is attached to the switch module 100 and docked magnetically to the UI module 400 in a first position with three edges of the single position wall plate 3000 aligned to the recessed area 441 of the UI module 400 and a fourth edge 3010 which is not aligned to the recessed area 441. In this position, the switch module 100 and wall plate 3000 are aligned to one side of the UI module 400 and only one set of the wireless power reception coil 427, retention magnets 431, 433 with ferrous steel shrouds 4610, 4630, IR light emitter 428 and IR light detector 429. The holding force produced by a single pair of retention magnets 431, 433 is sufficient to hold the UI module 400 in place and the power received by a single wireless power reception coil 427 is sufficient to fully power the UI module 400. FIG. 33 is similar to FIG. 32 but shows the wall plate 3000 and switch module 100 aligned to the other side of the recessed area 441 of the UI module 400 leaving the opposite edge 3020 of the wall plate 3000 exposed. The UI module 400 may be powered and retained by a single switch module 100 in either of the two positions illustrated in FIGS. 32 and 33. Finally, FIG. 34 shows that a two position wall plate 300 with two switch modules 100, 700 attached to it can also be docked magnetically to the UI module 400 but in this scenario the wall plate 300 fills nearly the entire height and width of the recessed area 441 of the UI module 400 and both wireless power reception coils, pairs of retention magnets, IR light emitters and IR light detectors are utilized by the interfacing components of each switch module 100, 700.

Figure 35:
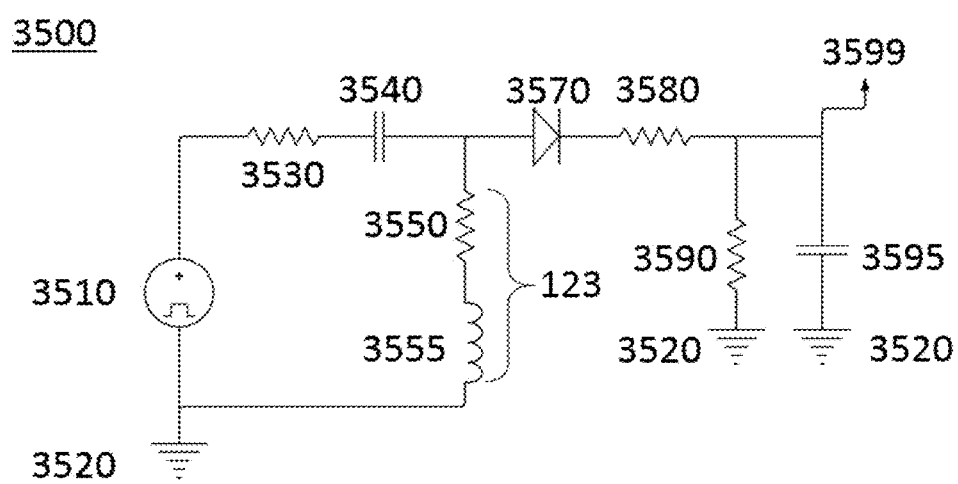
FIG. 35 illustrates a block diagram of a portion of the wireless power transmission circuit including the wireless power transmission coil.

The method of detecting a UI module 400 present over a switch module 100 was disclosed in a previous application as using a magnet and Hall effect sensor. However, a more cost effective detection solution may be employed which utilizes the wireless power transmission circuit 161, wireless power transmission coil 123, wireless power reception circuit 461 and wireless power reception coil 427. FIG. 35 illustrates a block diagram 3500 of a portion of the wireless power transmission circuit 161 including the wireless power transmission coil 123 having both an inductance 3555 and parasitic resistance 3550. The power transmission circuit comprises a voltage 3510 from an alternating current (AC) waveform at a controlled frequency. A variety of waveform shapes can be used including step or sinusoidal. The controlled frequency may be dynamic and changed by a microcontroller (not shown), if needed. The voltage 3510 and wireless power transmission coil 123 are connected to ground 3520. The voltage 3510 and wireless power transmission coil 123 are also connected to a resonant capacitor 3540 which has an equivalent series resistance of 3530. Between the wireless power transmission coil 123 and resonant capacitor 3540 is a modified peak detection circuit comprising a diode 3570, two resistors 3580, 3590 and a capacitor 3595. A voltage 3599 from the modified peak detection circuit is sent to an analog to digital converter (ADC) on the processor 151 of the switch module 100. Resistor 3580 is a resistor that, in conjunction with resistor 3590, forms a voltage divider circuit to get the voltage 3599 in the proper range of the processor's 151 ADC. The voltage 3599 to the MCU will change when different ferrous or metallic objects are positioned in front of the wireless power transmission coil 123. Since the wireless power reception coil 427 of the UI module 400 has a known inductance and known position and distance relative to the switch module 100 when installed, a range of voltages likely to represent a wireless power reception coil 427 can be set. When a UI module 400 is installed in front of a switch module 100, the voltage 3599 falls within the range of voltages and the inductive trigger 601 of FIG. 28 is completed.

The foregoing description and accompanying drawings detail a modular lighting control system which comprises a switch module installed in a typical switch box, a wall plate attached to the switch and a user interface (UI) module which aligns to the wall plate and interacts with the switch module. Although specific implementations of the disclosures were described and illustrated, variations may include but are not limited to: greater or fewer numbers of switch modules, larger or smaller UI modules capable of controlling greater or fewer circuits and UI modules that comprise other features like touchscreens, projectors, or gas sensors.

The invention claimed is:
1. A modular electrical control system comprising:
 a switch module comprising
  one or more switch module magnets,
  a wireless power transmission coil,
  an infrared light transmitter and an infrared light receiver; and
 a user interface module comprising
  one or more wireless power reception coils configured to inductively receive electrical power when in proximity to the wireless power transmission coil,
  one or more user interface module magnets configured to magnetically couple with the one or more switch module magnets,
  an infrared light emitter and an infrared light detector configured to provide two-way communication via the infrared light transmitter and infrared light receiver of the coupled switch module;
 wherein the user interface module is configured to be removably attached to and powered by any of a plurality of switch modules and configured to communicate with any of the plurality of switch modules without any mechanical attachment or electrical connection on either said switch module or said user interface module,
 wherein a first user interface module is configured to transmit a command via an infrared light emitter of the first user interface module to an infrared light receiver of a first switch module which the first user interface module is coupled to, and wherein the first switch module subsequently wirelessly transmits the received command to a second switch module, wherein the first user interface module matches inputs received on the second switch module to changes in a detected signal at a sensor on the first user interface module.

2. The modular electrical control system of claim 1, wherein said switch module further comprises a Hall effect sensor configured to determine when said user interface module is attached to said switch module.

3. The modular electrical control system of claim 2, wherein said user interface module further includes a Hall effect magnet.

4. The modular electrical control system of claim 3, wherein when the user interface module comes within a pre-defined distance of said switch module, the Hall effect sensor detects a presence of the Hall effect magnet of the user interface module and configures said switch module to transmit power using said wireless power transmission coil to said one or more wireless power reception coils on said user interface module in order to supply power to said user interface module.

5. The modular electrical control system of claim 3, wherein said user interface module configured to complete one of a boot or initialization sequence and send a confirmatory power up message to said infrared light receiver on said switch module.

6. The modular electrical control system of claim 5, wherein when one of said Hall effect sensor does not detect a presence of said Hall effect magnet, or said infrared light receiver of said switch module does not receive said confirmatory power up message within a pre-determined period of time, said switch module is configured to cease to supply power over said wireless power transmission coil.

7. The modular electrical control system of claim 1, wherein the switch module is configured to be installed in a wall-mounted electrical box and configured to measure inductance over said wireless power transmission coil.

8. The modular electrical control system of claim 1, further comprising a controller configured to control an amount of AC power provided by an attached electrical load.

9. The modular electrical control system of claim 8, wherein the amount of AC power has a predetermined frequency.

10. The modular electrical control system of claim 9, wherein the switch module is configured to convert the amount of AC power to DC power and DC power back to the amount of AC power at a new converted frequency.

11. The modular electrical control system of claim 10, wherein said DC power is configured to provide power to a plurality of electronic components.

12. The modular electrical control system of claim 10, wherein the new converted frequency is greater than the predetermined frequency.

13. The modular electrical control system of claim 1, wherein the wireless power transmission coil is configured to wirelessly transmit power to a separate device.

14. The modular electrical control system of claim 13, wherein said separate device is a user interface device.

15. The modular electrical control system of claim 1, wherein said wireless power transmission coil is a multi-layer, wire-wound coil backed by a layer of at least one of a ferrite or a ferrous material.

16. The modular electrical control system of claim 1, wherein said user interface module further comprises:
a touch sensor;
a display;
light emitting diodes (LEDs); and
tactile buttons.

17. The modular electrical control system of claim 1, wherein said user interface module further includes one or more sensors for temperature, humidity, ambient light and motion.

18. The modular electrical control system of claim 1, wherein said user interface module is configured to attach with said switch module using the one or more user interface module magnets.

19. The modular electrical control system of claim 1, wherein said one of more switch module magnets and said wireless power transmission coil of said switch module couple with said one or more user interface module magnets and said one or more wireless power reception coils in the said user interface module.

20. The modular electrical control system of claim 1, wherein said user interface module further includes one or more microphones and one or more speakers.

21. The modular electrical control system of claim 1, wherein said switch module further comprises of a tactile switch configured to trigger a plurality of lighting events.

22. The modular electrical control system of claim 1, wherein the first switch module is in communication with the second switch module via a switch module mesh network.

23. The modular electrical control system of claim 22, wherein the command transmitted from the first user interface module is transmitted to the second switch module via the switch module mesh network.

24. The modular electrical control system of claim 23, wherein the command transmitted from the first user interface module via the switch module mesh network to the second switch module controls a lighting control function of the second switch module.

25. The modular electrical control system of claim 1, wherein the changes in the detect signal at the sensor comprise changes in light detected at a light sensor on the first user interface module.

* * * * *